US 7,872,664 B2

(12) United States Patent
Yamakawa et al.

(10) Patent No.: US 7,872,664 B2
(45) Date of Patent: Jan. 18, 2011

(54) OPTICAL SCANNING DEVICE INCLUDING SHUTTER MEMBER THAT CLOSES OR OPENS AN EMISSION WINDOW AND IMAGE FORMING APPARATUS INCLUDING THE OPTICAL SCANNING DEVICE

(75) Inventors: Takeshi Yamakawa, Kanagawa (JP); Hiroshi Yoshizawa, Kanagawa (JP); Katsunori Shoji, Kanagawa (JP); Masanori Namba, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1150 days.

(21) Appl. No.: 11/525,964

(22) Filed: Sep. 25, 2006

(65) Prior Publication Data

US 2007/0070173 A1    Mar. 29, 2007

(30) Foreign Application Priority Data

Sep. 26, 2005   (JP)   ............................. 2005-277527
Nov. 29, 2005   (JP)   ............................. 2005-343797
Nov. 30, 2005   (JP)   ............................. 2005-346034

(51) Int. Cl.
*B41J 15/14*   (2006.01)
*B41J 27/00*   (2006.01)

(52) U.S. Cl. ...................................... 347/241; 347/256

(58) Field of Classification Search ................. 347/230, 347/241, 242, 256, 257
See application file for complete search history.

(56) References Cited

U.S. PATENT DOCUMENTS

| | | | |
|---|---|---|---|
| 5,936,652 A * | 8/1999 | Narayan et al. | ............. 347/136 |
| 6,072,516 A | 6/2000 | Yamakawa | |
| 6,236,418 B1 | 5/2001 | Yamakawa | |
| 6,243,128 B1 | 6/2001 | Yamakawa | |

(Continued)

FOREIGN PATENT DOCUMENTS

CN        1689821        11/2005

(Continued)

OTHER PUBLICATIONS

Chinese Patent Office Action dated Sep. 21, 2007 for corresponding Chinese Patent Application No. 200610138928.1 and the English translation thereof.

(Continued)

*Primary Examiner*—Hai C Pham
(74) *Attorney, Agent, or Firm*—Harness, Dickey & Pierce, P.L.C.

(57) ABSTRACT

An optical scanning device, that outputs a light beam through an emission window in an optical housing to scan a surface, may include a shutter member that closes or opens the emission window. The shutter member may include a first opening, that may allow the light beam passed through the emission window to pass the first opening, and a second opening, that may be at a position corresponding to an insertion operation of a cleaning member for cleaning the emission window. The shutter member may include a first opening, that may be on a front surface of the shutter member to allow the light beam passed through the emission window to pass the first opening, and a second opening, that may be on a side surface of the shutter member to allow a cleaning member to be inserted through the second opening for cleaning the emission window.

20 Claims, 18 Drawing Sheets

U.S. PATENT DOCUMENTS

| | | |
|---|---|---|
| 6,308,024 B1 | 10/2001 | Nakayama et al. |
| 6,339,491 B1 * | 1/2002 | Kondou et al. ............ 359/212.1 |
| 6,346,961 B1 * | 2/2002 | Schmid ....................... 347/241 |
| 6,593,951 B2 | 7/2003 | Yokoyama |
| 6,829,001 B2 | 12/2004 | Yamakawa |
| 7,203,444 B2 * | 4/2007 | Yamazaki ..................... 399/98 |
| 7,352,377 B2 * | 4/2008 | Matsutomo ................. 347/136 |
| 7,474,451 B2 | 1/2009 | Yamakawa |
| 2003/0058513 A1 | 3/2003 | Yoshizawa |
| 2005/0012974 A1 | 1/2005 | Ono |
| 2005/0089315 A1 | 4/2005 | Imamura et al. |
| 2005/0243156 A1 | 11/2005 | Matsutomo |

FOREIGN PATENT DOCUMENTS

| | | |
|---|---|---|
| EP | 1 538 001 | 6/2005 |
| JP | 04-283772 | 10/1992 |
| JP | 11-167080 | 6/1999 |
| JP | 11167080 A * | 6/1999 |
| JP | 2000-263839 | 9/2000 |

OTHER PUBLICATIONS

European Search Report.

* cited by examiner

OPTICAL SCANNING DEVICE INCLUDING SHUTTER MEMBER THAT CLOSES OR OPENS AN EMISSION WINDOW AND IMAGE FORMING APPARATUS INCLUDING THE OPTICAL SCANNING DEVICE

CROSS-REFERENCE TO RELATED APPLICATIONS

The present document incorporates by reference the entire contents of Japanese priority document, 2005-277527 filed in Japan on Sep. 26, 2005, 2005-343797 filed in Japan on Nov. 29, 2005 and 2005-346034 filed in Japan on Nov. 30, 2005.

BACKGROUND OF THE INVENTION

1. Field of the Invention

The present invention relates to an optical scanning device that performs optical writing in an electrophotographic-type printer or the like, and an image forming apparatus having the optical scanning device mounted thereon.

2. Description of the Related Art

Image forming apparatuses such as a laser beam printer, a digital copying machine, and a laser facsimile include an optical scanning device for writing a latent image on a photoconductor. Since high quality images are demanded of the image forming apparatuses in recent years, degradation of image quality due to interruption of laser beams, which is caused by adhesion of dust and dirt such as toner to a laser beam emitting unit, in the optical scanning device has been a major problem. In addition, with an increasing demand for downsizing of image forming apparatuses, arrangement of an optical write unit (an optical scanning device) in the image forming apparatuses has been diversified. In some cases, the optical write unit is arranged in a horizontal direction or below thereof, with respect to an image carrier of an imaging unit. In such a configuration, a dustproof glass provided at a laser beam emitting port is contaminated due to toner falling from the imaging unit or to dust and dirt scattering in the apparatus, thereby causing abnormality on formed images. Therefore, for example, in Japanese Patent Application Laid-Open No. 2000-263839, it is proposed to provide a shutter mechanism between an image carrier and an optical scanning device.

However, in the proposed technique, the shutter mechanism is arranged between the image carrier and the optical scanning device. Therefore, a space required in a vertical direction in an image forming apparatus increases, and the configuration contradicts with the downsizing demand accordingly.

Furthermore, in the apparatus described in Japanese Patent Application Laid-Open No. 2000-263839, since a gap between the shutter mechanism and the optical scanning device is large, toner and dust can enter from a lateral direction. Accordingly, degradation of the image quality cannot be sufficiently prevented.

Further, when the optical scanning device is arranged below the horizontal direction, there is a problem that dirt in the image forming apparatus is likely to adhere to a transparent member such as a dustproof glass provided on a light emitting window.

In addition, in recent image forming apparatuses, there is a trend that toners having a nearly spherical shape are used instead of ones with conventional shapes. However, the toners having the nearly spherical shape have a problem of cleanability, and cleaning of the toners by conventional techniques can be insufficient. With respect to this problem, for example, as in the technique of Japanese Patent Application Laid-Open No. 2000-263839, a shutter can be provided between the optical scanning device and the image carrier. However, since the shutter is open at the time of image formation, scattered dirt adheres to the dustproof glass.

Accordingly, since it is difficult to completely prevent degradation of image quality due to dirt only by a shutter, a cleaning unit needs to be provided separately. In this case, a configuration that combines the cleaning unit and the shutter is required.

SUMMARY OF THE INVENTION

It is an object of the present invention to at least partially solve the problems in the conventional technology.

An optical scanning device according to one aspect of the present invention outputs a light beam from a light source through an emission window in an optical housing to scan a surface to be scanned. The optical scanning device includes a shutter member that closes or opens the emission window.

An image forming apparatus according to another aspect of the present invention includes an optical scanning device that outputs a light beam from a light source through an emission window in an optical housing to scan a surface to be scanned. The optical scanning device includes a shutter member that closes or opens the emission window.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
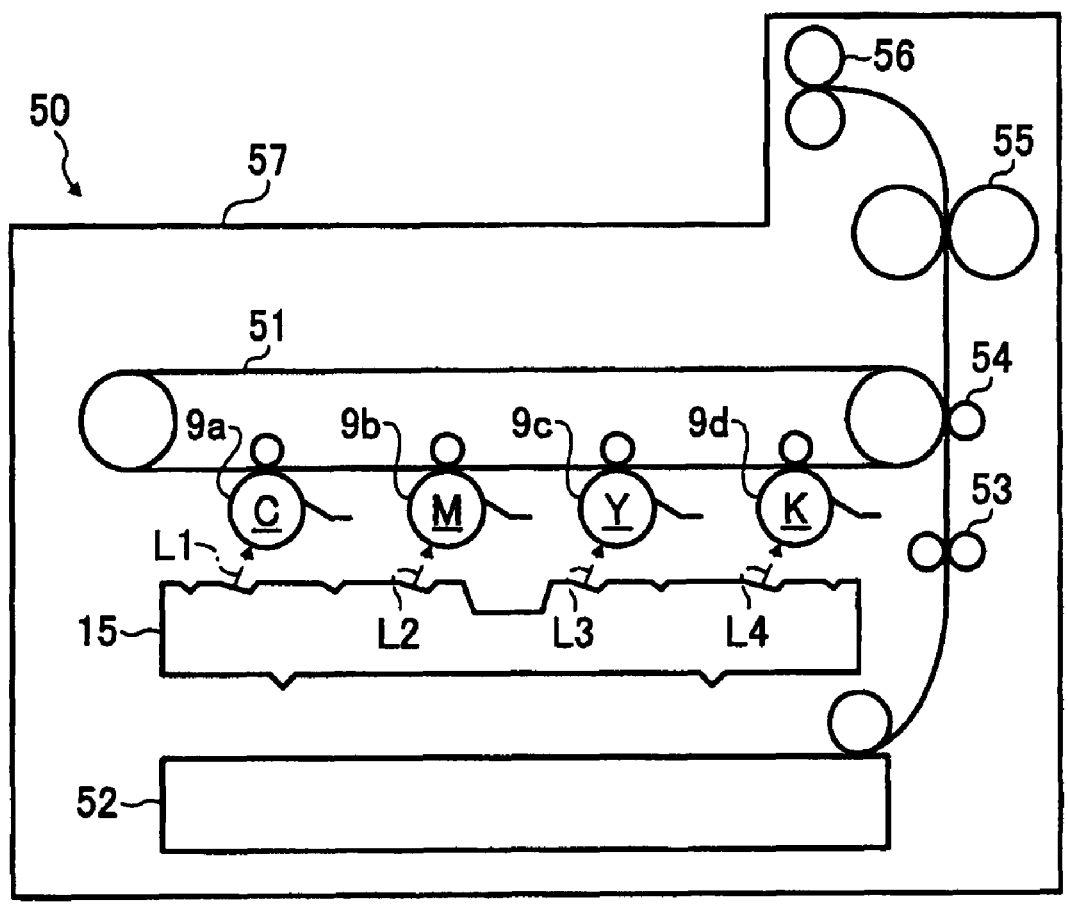
FIG. 1 is a cross-sectional configuration diagram of an outline of an image forming apparatus including an exemplary optical scanning device according to the present invention.

Exemplary embodiments of the present invention will be explained below in detail with reference to the accompanying drawings. FIG. 1 is a cross-sectional configuration diagram of an outline of an image forming apparatus including an exemplary optical scanning device according to the present invention. A full color printer 50 shown in FIG. 1 is a so-called four-stage tandem image forming apparatus, in which four imaging units (for four colors) are arranged opposite to a transfer belt 51, and toner images on respective photo-sensitive drum 9a, 9b, 9c and 9d are transferred to and superposed on the transfer belt 51 to transfer the toner images onto a recording material fed from a paper feeder 52, thereby obtaining a full color image in a short period of time.

The transfer belt 51 is rotated in a counter-clockwise direction in FIG. 1. Four imaging units (for four colors) respectively including the photo-sensitive drum 9 as a chief component are arranged in parallel below the transfer belt 51. The configuration of the respective color imaging units is the same, and only the color of toner to be used is different. According to the present embodiment, respective color toners of cyan, magenta, yellow, and black (sings indicating the respective colors, that is, C, M, Y, and K are written in the photo-sensitive drum 9) are used in the respective color imaging units to form an image. An optical scanning device 15 is arranged below the imaging units. The recording material fed from the paper feeder 52 is sent from a resist roller pair 53, with timing adjusted with the toner image on the transfer belt 51. The toner image on the transfer belt 51 is transferred onto the recording material by an action of a transfer roller 54, which is a transfer unit. The toner image on the recording material is fixed by a fuser 55, and the recording material is ejected onto a paper ejection tray 57 by an ejection roller pair 56 and stacked thereon.

Figure 2:
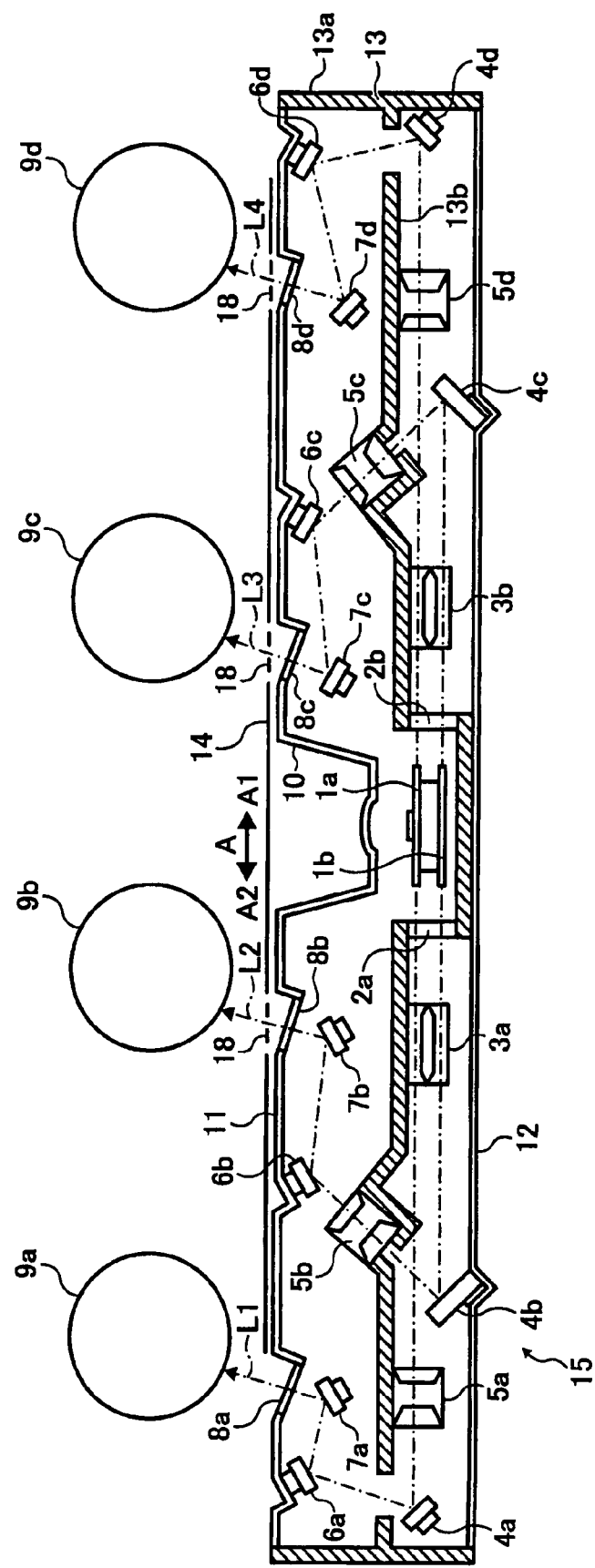
FIG. 2 is an enlarged diagram near the optical scanning device in detail.

FIG. 2 is an enlarged diagram near the optical scanning device 15 in detail. As shown in FIG. 2, the optical scanning device 15 includes two-stage polygon mirrors 1a and 1b, soundproof glasses 2a and 2b, fθ lenses 3a and 3b, first to third mirror groups 4a, 4b, 4c, 4d, 6a, 6b, 6c, 6d, 7a, 7b, 7c, and 7d, long lenses 5a, 5b, 5c, and 5d, and dustproof glasses 8a, 8b, 8c, and 8d, and these are arranged in an optical housing 13.

The polygon mirrors 1a and 1b have a reflecting mirror on each side of a regular polygon, and is rotated by a polygon motor (not shown) at a high speed, to deflect laser beams from a light source (not shown) to scan. The soundproof glasses 2a and 2b reduce noise generated by the polygon motor. The fθ lenses 3a and 3b convert isometric motion of beam scanning by the polygon mirrors 1a and 1b into uniform linear motion. The first to the third mirror groups 4a, 4b, 4c, 4d, 6a, 6b, 6c, 6d, 7a, 7b, 7c, and 7d guide the laser beams to respective photoconductors 9 arranged above the optical scanning device 15. The long lenses 5a, 5b, 5c, and 5d correct an optical surface tangle error of the polygon mirror, and has a function of correcting the position of scanning line in a vertical scanning direction. The dustproof glasses 8a, 8b, 8c, and 8d prevent dust from falling into the optical housing 13.

The optical housing 13 includes a side wall 13a, an optical element-arranged surface 13b, an upper cover 11 and a lower cover 12 for sealing the housing, and a lid 10 of the polygon mirror portion. A shutter member 14 is slidably and integrally mounted and supported on the upper cover 11. In FIGS. 1 and 2, optical paths to respective photoconductors are shown as L1, L2, L3, and L4.

Figure 3:
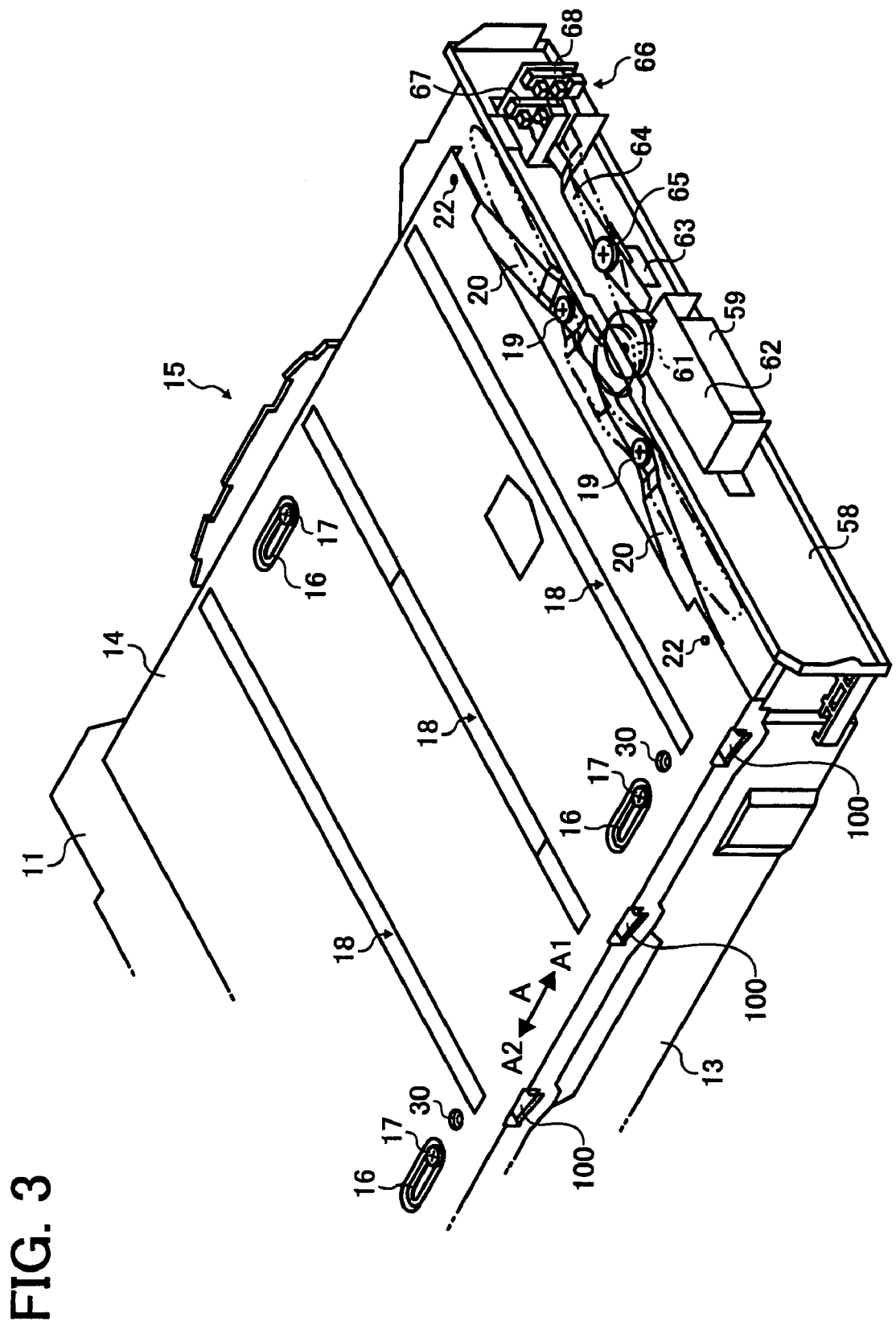
FIG. 3 is a perspective view of the optical scanning device and a shutter drive mechanism therein.

FIG. 3 is a perspective view of the optical scanning device 15 and a shutter drive mechanism therein. In FIG. 3, reference numeral 58 is a surface plate provided on the main unit of the image forming apparatus. The optical scanning device 15 is positioned in and fixed to the image forming apparatus main unit such that a right side wall 13a of the optical housing 13 shown in FIG. 2 is fixed to or placed adjacent to the surface plate 58.

As shown in FIG. 3, the shutter member 14 mounted on an upper surface of the optical housing 13 has three guide grooves 16 extending in a direction (in a longitudinal direction of the optical scanning device 15) orthogonal to a horizontal scanning direction. A stepped screw 17 is screwed to the upper cover 11 in each guide groove 16 so as to press down the shutter member 14. Although described later in detail, by the stepped screw 17, the shutter member 14 is restricted from rising from the upper cover 11, and an appropriate gap required for sliding of the shutter member 14 can be ensured, so that the shutter member 14 is supported so as to be able to reciprocate as shown by arrow A.

The shutter member 14 has three openings 18 provided in parallel with the horizontal scanning direction so as to allow scanning beams to pass therethrough. FIG. 3 depicts a state where the shutter is closed, and when the shutter member 14 is shifted in a direction A1 from this shutter closing position up to a position shown in FIG. 2, the shutter is opened. At the shutter opening position, the three openings 18 are positioned above the dustproof glasses 8b, 8c, and 8d on the upper surface of the housing. In FIG. 2, an opening with respect to the leftmost dustproof glass 8a is not provided in the shutter member 14, however, when the left end of the shutter member 14 is shifted to the right side of the dustproof glass 8a in FIG. 2, the upper part of the dustproof glass 8a is opened. Thus, the shutter is opened, and scanning beams L1 to L4 pass through the dustproof glasses 8a, 8b, 8c, and 8d, thereby enabling exposure.

When the shutter member 14 is shifted in a direction A2 from the shutter opening position shown in FIG. 2 to close the shutter as shown in FIG. 3, each opening 18 of the shutter member 14 is shifted from the positions of the dustproof glasses 8b, 8c, and 8d, and further, the end of the shutter member 14 is shifted to above the dustproof glass 8a. Accordingly, all dustproof glasses 8a, 8b, 8c, and 8d are covered with the shutter member 14.

In the optical scanning device 15 according to the present embodiment, since the shutter member 14 is integrally provided with the optical housing 13, the image forming apparatus can be formed in a small size without increasing a vertical space. Furthermore, since the shutter member 14 is integrally provided with the optical housing 13, there is no gap between the shutter member and the optical scanning device as in conventional cases, whereby toner and dust can be prevented from entering from a lateral direction, and degradation of the image quality due to adhesion of toner and dust to the dustproof glass can be effectively prevented.

The shutter drive mechanism is explained next with reference to FIGS. 3 and 4.

A pair of levers 20, which are link members, is fitted to one end in a longitudinal direction of the upper surface of the upper cover 11 of the optical housing, so as to be rotatable by shafts 19. Torsion coil springs 21 are respectively fitted to the shafts 19. The coil springs 21 are engaged with each lever at one end and engaged with engaging parts 23, 23 provided in the upper cover 11 at the other end, so as to bias the left lever 20 in FIG. 4 in a clockwise direction and the right lever 20 in a counter-clockwise direction. In other words, the torsion coil spring 21 biases the shutter member 14 in a closing direction.

A pin-receiving hole 20a is formed at an outer end of each lever 20, and pins 22, 22 provided downward in a protruding condition (implanted) at the end of the shutter member 14 is fitted loosely to the pin-receiving hole 20a. Therefore, when the pair of levers 20 rotates about the shafts 19, the shutter member 14 is shifted in a vertical direction (in the longitudinal direction of the optical scanning device 15: a direction of arrow A in FIG. 1) in FIG. 4. According to the present embodiment, the length of the lever 20 from the shaft 19 to the portion (outer part) on the pin-receiving hole 20a side is set larger than that of the lever 20 from the shaft 19 to a portion opposite to the pin-receiving hole 20a (inner part). Accordingly, a shift amount of the shutter member 14 when the pair of levers 20 as the link member rotates about the shafts 19 becomes large.

On the other hand, a motor 59 as a shutter driving source is mounted on the surface plate 58, which is a member on a side of the main unit of the image forming apparatus, via a bracket 62. A shaft 60 rotated by the motor 59 protrudes from the upper surface of the bracket 62, and an eccentric cam 61 is fixed to the rotation shaft 60. The eccentric cam 61 rotates so as to include a position indicated by a solid line and a position indicated by a virtual line in FIG. 4, due to the rotation of the motor 59. A hole through which the eccentric cam 61 can protrude toward the optical scanning device 15 is provided in the surface plate 58, and the side surface of the eccentric cam 61 is made to abut against one of the levers 20 (according to the present embodiment, the right lever 20 in FIG. 4). The end (the part abutting against the eccentric cam 61) of the lever 20 is bent perpendicularly downward, so that the lever 20 and the eccentric cam 61 have surface-to-surface contact with each other. The lever end of the other lever (according to the present embodiment, the left lever 20 in FIG. 4) is not bent, and the plane lever end is made to abut against the side surface (the upper surface in FIG. 4) of the bent portion of the right lever 20, and pressed together with the right lever 20 by the eccentric cam 61.

Since the eccentric cam 61 rotates, the side surface of the eccentric cam 61 presses the inner end of the levers 20, so that each lever 20 rotates about the shafts 19. Accordingly, the shutter member 14 is shifted in the vertical direction in FIG. 4 (in the longitudinal direction of the optical scanning device 15: the direction of arrow A in FIG. 1).

Figure 4:
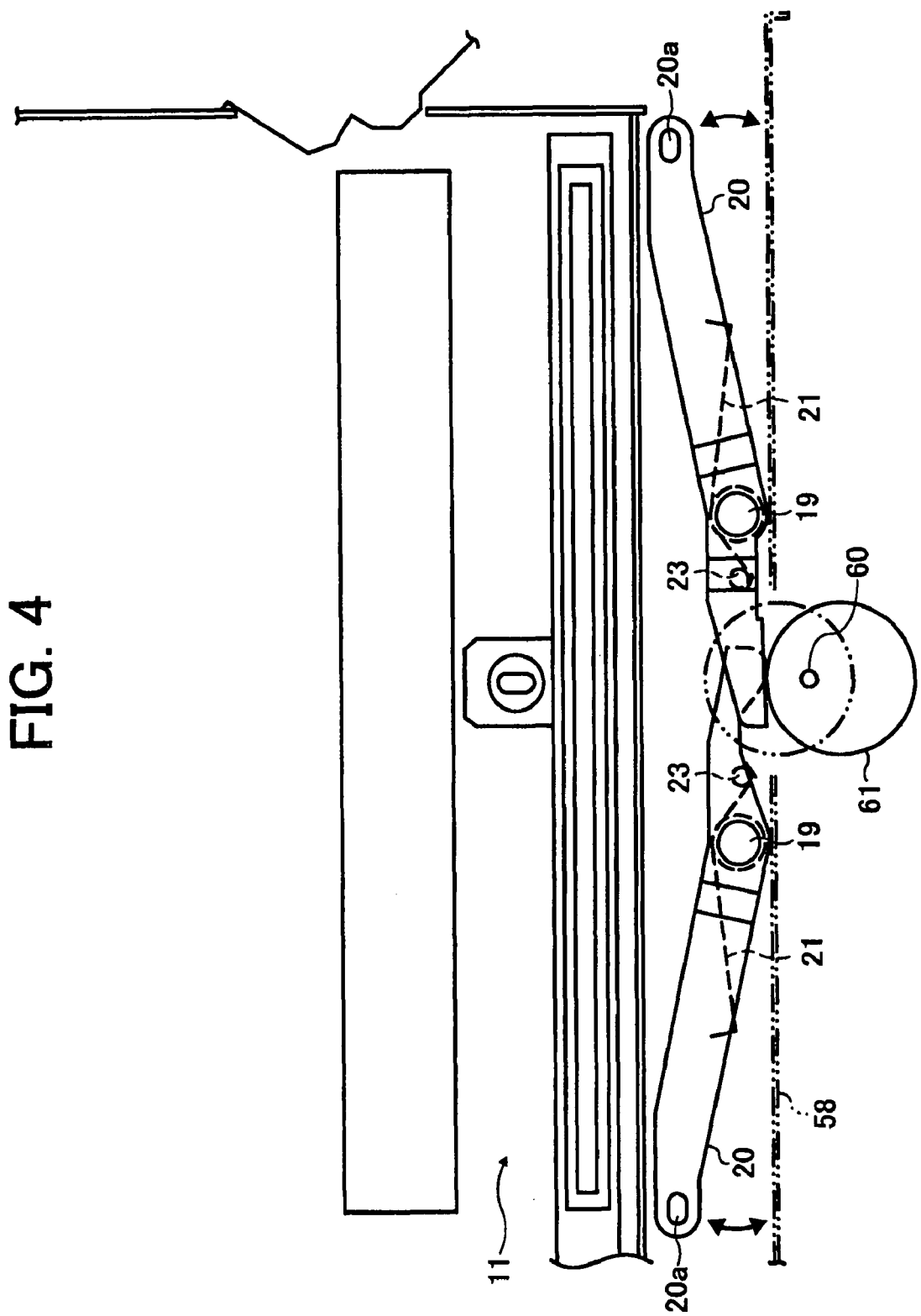
FIG. 4 is a partial plan view near a link member of a shutter drive mechanism.

When the eccentric cam 61 is shifted to the position indicated by the solid line in FIG. 4, pressing of the levers 20 by the eccentric cam 61 is released. Accordingly, the levers 20 biased by the torsion coil springs 21 rotate to the positions shown in FIG. 4 (positions indicated by solid line in FIG. 3), thereby shifting the shutter member 14 to the closing position shown in FIG. 3.

When the eccentric cam 61 is shifted to the position indicated by the virtual line in FIG. 4, the eccentric cam 61 makes the levers 20 rotate to the positions indicated by the virtual line in FIG. 3 against the biasing force of the torsion coil springs 21, thereby shifting the shutter member 14 to the opening position shown in FIG. 2.

Normally (when an image is not formed), the eccentric cam 61 is at the position indicated by the solid line in FIG. 4, and at this time, the shutter member 14 is held at the shutter closing position by the biasing force of the torsion coil springs 21. At the time of forming an image, when a shift instruction to a writable state is issued, the motor 59 is driven to rotate the eccentric cam 61 by a predetermined amount, thereby opening the shutter.

In the optical scanning device 15 according to the present embodiment, since the shutter member 14 is biased to a closing direction by an biasing unit (the torsion coil spring 21), the shutter member 14 can protect the dustproof glasses 8a, 8b, 8c, and 8d, which are emission windows, other than at the timing requiring optical writing, and hence damages due to adhesion of the toner and dust to the dustproof glasses can be minimized. Accordingly, an excellent image can be continuously maintained without causing lines or unevenness in the formed image. Furthermore, a situation where the dustproof glasses 8a, 8b, 8c, and 8d need to be cleaned can be reduced to the minimum.

Since the shutter member 14 is biased to the closing direction by the biasing unit, the shutter member 14 can be held at the shutter closing position, in the state before the optical scanning device 15 is assembled in the image forming apparatus main unit or when the optical scanning device 15 is detached from the image forming apparatus main unit. Therefore, at the time of assembling the optical scanning device 15 in the image forming apparatus in a factory, or when it is necessary to change the optical scanning device 15 for repair or the like, or at the time of transport of the optical scanning device 15, since the dustproof glasses 8a, 8b, 8c, and 8d are covered with the shutter member 14 and not exposed outside, adhesion of dust to the dustproof glasses can be prevented, and the dustproof glasses can be prevented from being damaged or broken due to an operation error or the like, thereby enabling protection of the expensive optical scanning device.

When the optical scanning device 15 is mounted on the image forming apparatus main unit, as described above, the levers 20 are arranged so that the inner ends thereof come in contact with the side surface of the eccentric cam 61, and since the eccentric cam 61 is rotated by the motor 59, the shutter is opened or closed.

Figure 5:
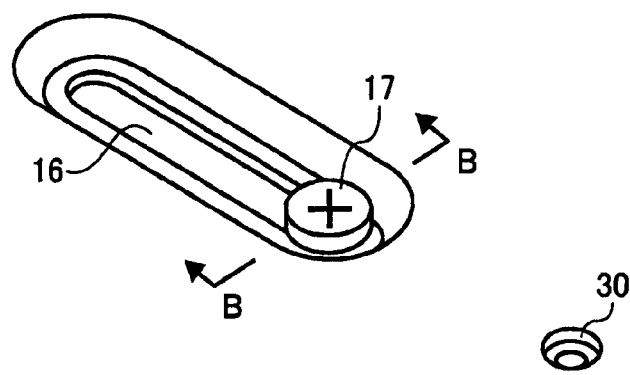
FIG. 5 is a partial perspective view near a guide groove of a shutter member.
Figure 6:
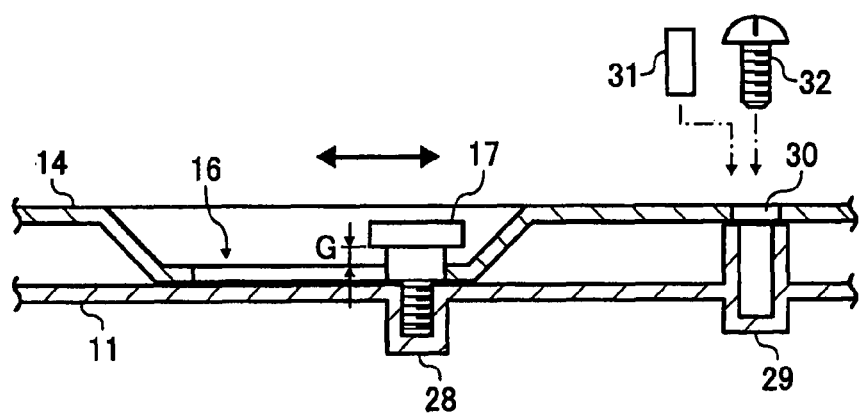
FIG. 6 is a cross section near the guide groove.

FIG. 5 is a partial perspective view near the guide groove 16 for slidably holding the shutter member 14 on the upper cover 11 of the optical housing. FIG. 6 is a cross section near the guide groove 16.

The stepped screw 17 for holding down the shutter member 14 is formed of, in order of from the bottom as shown in FIG. 6, a screw part that is screwed into a screw hole in the upper cover 11, a screw body having a smaller diameter than the width of the guide groove 16 and loosely fitted to the guide groove, and a screw head having a larger diameter than the width of the guide groove 16. The shutter member 14 has a depressed shape around the guide groove 16, so that a peripheral part of the guide groove 16 becomes lower than other parts, and the screw head of the stepped screw 17 is fitted to the depressed portion. Accordingly, members constituting the guide mechanism such as the stepped screw 17 do not protrude from the upper surface of the shutter member 14. The length (height) of the stepped screw 17 is set larger than the thickness of the shutter member 14, and hence when the stepped screw 17 is fastened to the upper cover 11 in the guide groove 16, a gap G is formed between the screw head and the shutter member 14. According to such a configuration, the shutter member 14 is restricted from rising from the upper cover 11 by the stepped screw 17, and is supported slidably, while an appropriate gap required for sliding of the shutter member 14 is ensured. FIG. 6 depicts positions of the shutter member 14, the guide groove 16, and the stepped screw 17 at the shutter closing position, at which the stepped screw 17 abuts against the end of one side of the guide groove 16.

According to the present embodiment, the shutter member 14 is formed so as to be maintained at the shutter closing position. In other words, as shown in FIG. 6, an engaging member-receiving hole 29, into which an engaging member such as a pin 31 or a screw 32 is inserted, is provided near a screw-receiving hole 28 for receiving the stepped screw 17 in the upper cover 11 of the optical housing. An engaging member insertion hole 30 is provided on the shutter member 14 at a position corresponding to the engaging member-receiving hole 29 in the upper cover 11 at the time of positioning the shutter member 14 at the shutter closing position. The engaging member-receiving hole 29 in the upper cover 11 and the engaging member insertion hole 30 in the shutter member 14 can be provided in correspondence with the guide grooves 16 at three positions. However, according to the present embodiment, as shown in FIG. 3, the engaging member-receiving hole 29 and the engaging member insertion hole 30 are provided at two positions near the two guide grooves, which are on the front side when the optical scanning device 15 is mounted on the image forming apparatus main unit (in FIG. 3, only the engaging member insertion hole 30 is shown).

The shutter member 14 is then shifted to the shutter position shown in FIG. 6, and the engaging member such as the pin 31 or the screw 32 is inserted from the engaging member insertion hole 30 and held in the engaging member-receiving hole 29, thereby holding the shutter member 14 at the shutter closing position. Accordingly, the shutter can be prevented from opening inattentively. For example, when it is desired to avoid contamination of the dustproof glasses 8 as less as possible, for example, after manufacturing of the optical scanning device 15 until assembling it in the image forming apparatus, the shutter member 14 can be held at the shutter closing position reliably by using the engaging member.

Although not shown, the engaging member-receiving hole and the engaging member insertion hole for maintaining the shutter member 14 at the shutter opening position can be provided, respectively, in the upper cover 11 and the shutter member 14, in the same manner as the engaging member-receiving hole 29 and the engaging member insertion hole 30. In this case, the engaging member-receiving hole and the engaging member insertion hole for maintaining the shutter member 14 at the shutter opening position can be arranged on the side opposite to the engaging member-receiving hole 29 and the engaging member insertion hole 30, putting the guide groove 16 therebetween. Accordingly, for example, it is desired not to suspend the use of the image forming apparatus, although the motor 59 for shifting the shutter member 14 is out of order, the shutter member 14 can be maintained at the shutter opening position by the engaging member such as the screw 32, thereby keeping operations of the apparatus.

With referred to supply of the optical scanning device for repair in the market, it is considered that a long time is required until the optical scanning device is assembled in the image forming apparatus and can be used. Therefore, the configuration in which the shutter member 14 is maintained at the shutter closing position and at the shutter opening position is effective both for continuing the operation of the image forming apparatus and for preventing contamination of the dustproof glasses of the optical scanning device for replacement.

When the screw 32 is used as the engaging member, the engaging member does not come off due to vibration or the like, and hence the shutter member 14 can be maintained at the shutter closing position or the shutter opening position more reliably. On the other hand, when the shutter member 14 needs only to be maintained at the shutter closing position or the shutter opening position for a short period, or vibrations do not need to be considered, deterioration of workability can be prevented by using the pin 31 as the engaging member, since attachment and detachment thereof are facilitated.

Figure 7:
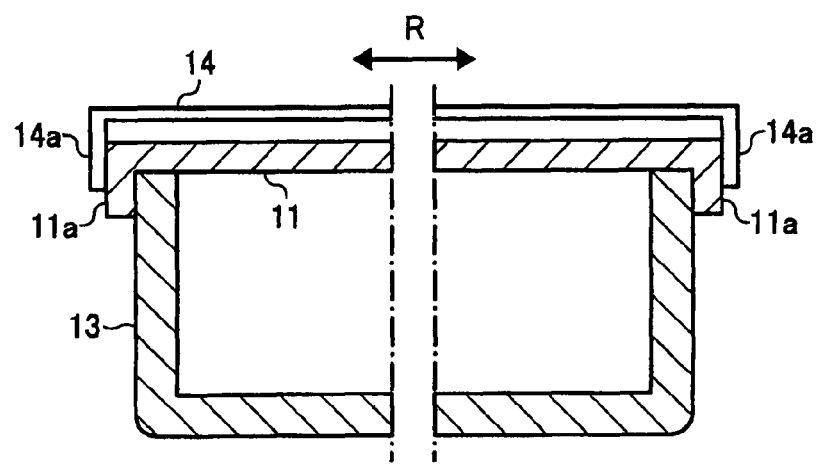
FIG. 7 is a schematic diagram for explaining a configuration for guiding the shutter member.

FIG. 7 is a schematic diagram for explaining a configuration for guiding the shutter member 14 in a width direction (a direction parallel to the horizontal scanning direction) of the optical scanning device 15.

As shown in FIG. 7, opposite ends of the upper cover 11 fitted to the optical housing 13 are bent downward to form end surfaces 11a, respectively on the both sides of the housing. The shutter member 14 is also bent downward at the opposite ends in the width direction thereof to form end surfaces 14a, 14a. A slight gap required for sliding of the shutter member 14 is formed between the end surfaces 11a of the upper cover 11 and the end surfaces 14a, 14a of the shutter member 14, although not shown in FIG. 7. Consequently, the shutter member 14 is guided and held in the width direction (in a direction R shown by arrow in FIG. 7) of the optical scanning device 15, so as to be able to slide appropriately without meandering, and can reciprocate in the longitudinal direction (the direction A shown in FIGS. 2 and 3) of the optical scanning device 15.

Figure 8:
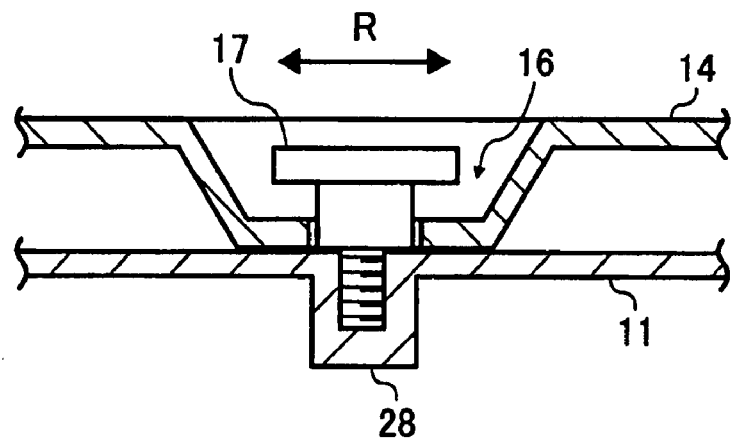
FIG. 8 is a schematic diagram of another configuration for guiding the shutter member.

The shutter member 14 can be guided in the width direction of the optical scanning device 15 according to a configuration shown in FIG. 8. FIG. 8 is a cross section of the guide groove 16 as viewed from a direction vertical to the page in FIG. 6. Although not shown in FIG. 8, a slight gap required for sliding of the shutter member 14 is formed between the opposite end surfaces (end surfaces in the direction R) of the guide groove 16 and opposite end surfaces of the screw body of the stepped screw 17. Consequently, the shutter member 14 is guided and held in the width direction (in the direction R shown by arrow in FIG. 7) of the optical scanning device 15, and can reciprocate in the longitudinal direction (the direction A shown in FIGS. 2 and 3) of the optical scanning device 15.

The operation of the shutter member 14 must be reliably controlled to the shutter closing position for blocking the laser beams as the scanning beams and to the shutter opening position for allowing passage of the laser beams. According to the present embodiment, therefore, a mechanism for detecting that the shutter member 14 is at the closing position or at the opening position is provided.

In other words, as shown in FIG. 3, a bracket 63 is fitted to the side surface of the surface plate 58 opposite to the optical scanning device 15. A detection lever 64 is rotatably supported on the bracket 63 by a shaft 65. One end of the detection lever 64 is bent perpendicularly upward and the bent portion abuts against the side surface of the eccentric cam 61. A sensor 66 is provided near the opposite end of the detection lever 64. The sensor 66 includes two photo interrupters 67 and 68 according to the present embodiment, and is supported to the surface plate 58 via a bracket. The opposite end (the end opposite to the eccentric cam 61) of the detection lever 64 forms a feeler (a portion to be detected) detected by the sensor 66. Since the end of the lever interrupts the photo interrupters 67 and 68, it is detected whether the shutter member 14 is at the closing position or at the opening position.

A torsion coil spring (not shown) is fitted to the shaft 65 that pivotally supports the detection lever 64, and the detection lever 64 is biased in a clockwise direction in FIG. 3 (in a direction for allowing the bent portion of the lever to abut against the eccentric cam 61) by the torsion coil spring. In the shutter closing state of the eccentric cam 61 shown by solid line in FIGS. 3 and 4, the detection lever 64 is pressed by the eccentric cam 61, and the feeler interrupts the photo interrupter 67. In the shutter opening state of the eccentric cam 61 shown by virtual line in FIGS. 3 and 4, a thrust of the eccentric cam 61 is released so that the torsion coil spring rotates the detection lever 64 to a position shown by virtual line, and the feeler interrupts the photo interrupter 68. According to the present embodiment, therefore, it is detected that the shutter member 14 is at the closing position due to output off of the photo interrupter 67, and that the shutter member 14 is at the opening position due to output off of the photo interrupter 68. The shutter driving motor 59 is controlled based on the output of the sensor 66 (photo interrupters 67 and 68), so that drive control and stop control can be performed appropriately.

Figure 9:
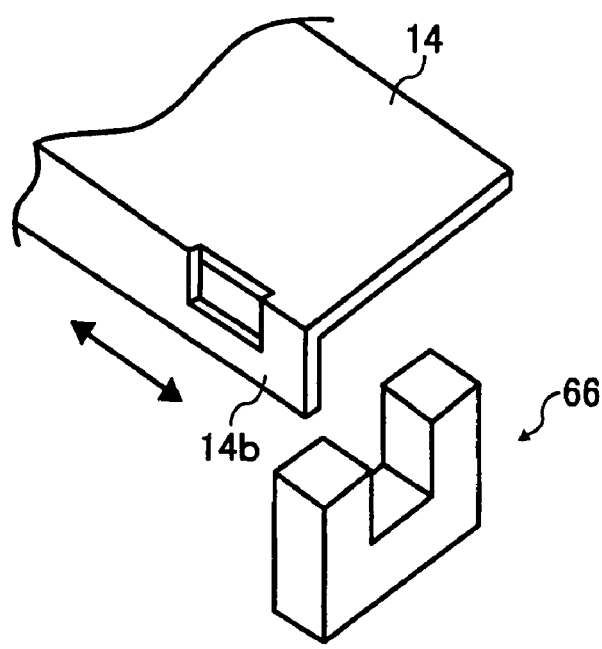
FIG. 9 is a partial perspective view of another example of a shutter member-detecting mechanism.

FIG. 9 is a partial perspective view of another example of the shutter member-detecting mechanism. In FIG. 9, the end of the shutter member 14 is formed as a portion to be detected 14b, and the sensor 66 for detecting the portion to be detected 14b is arranged. As the shutter member 14 reciprocates in the direction A in FIGS. 2 and 3, the portion to be detected 14b interrupts the photo interrupter of the sensor 66 at the shutter closing position. When the shutter is opened, the portion to be detected 14b is pulled out from the sensor 66, and hence the opening or closing state of the shutter can be detected based on an output of the sensor 66.

When the sensor that detects the opening or closing state of the shutter is mounted on the optical scanning device side, a movement of the shutter member can be directly detected, thereby enabling highly accurate detection. On the other hand, the cost of the optical scanning device itself, which is considered to be a service unit, increases, and manageability of a harness (required for transmitting the sensor output to the apparatus main unit), at the time of attaching or detaching the optical scanning device, deteriorates. Accordingly, an optimum method as the system can be appropriately selected whether to arrange the sensor for detecting the opening or closing state of the shutter on the image forming apparatus main unit side or to arrange it on the optical scanning device side.

Figure 10:
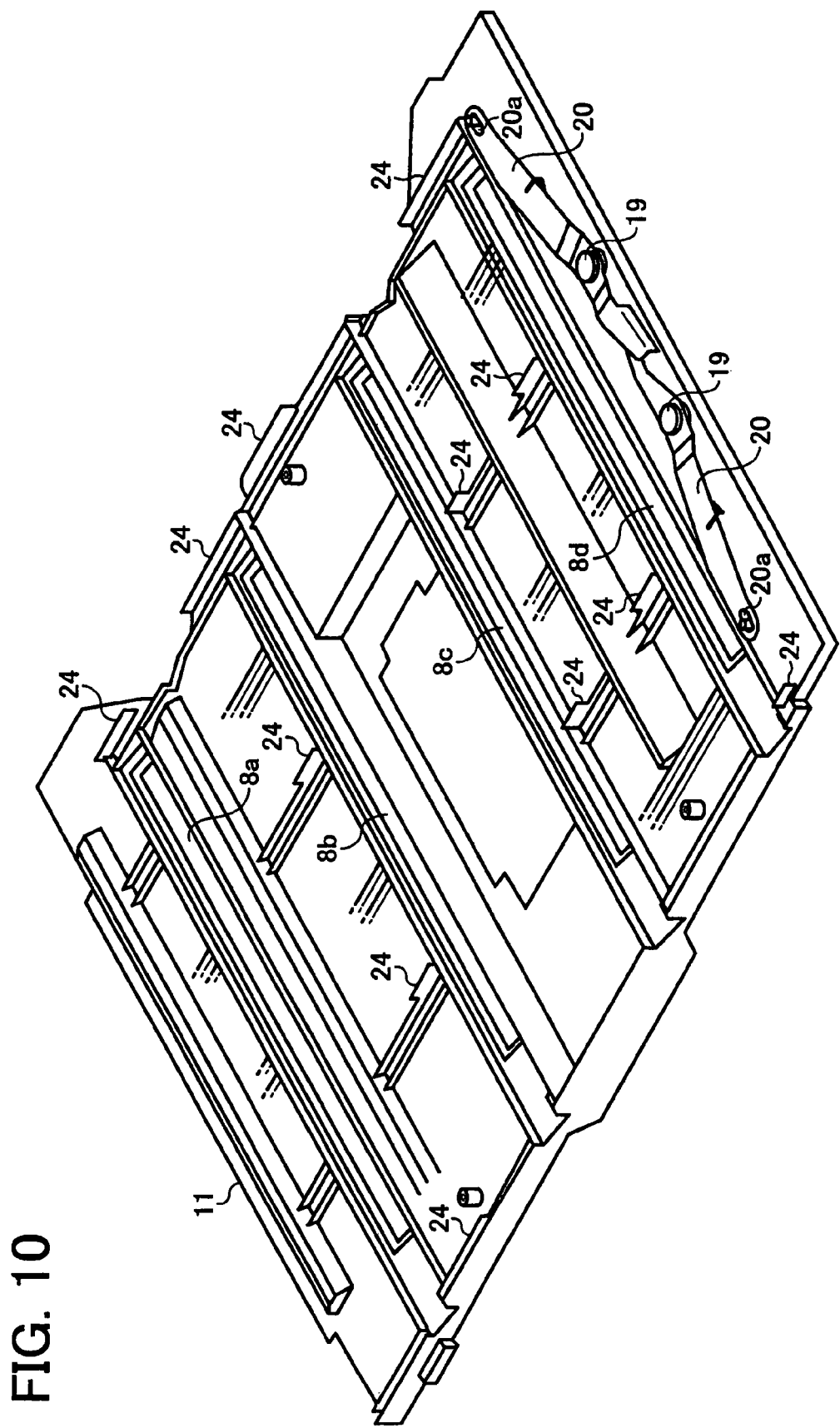
FIG. 10 is a perspective view of a configuration of an upper cover of an optical housing.

The shutter drive mechanism is explained with respective to FIGS. 3, 4, and 10. As described above, a hole through which the eccentric cam 61 protrudes toward the optical scanning device 15 is provided in the surface plate 58, and the side surface of the eccentric cam 61 is made to abut against one of the levers (according to the present embodiment, the right lever 20 in FIG. 4). The end of this lever 20 (the portion abutting against the eccentric cam 61) is bent perpendicularly downward as shown in FIG. 10, so that the lever and the eccentric cam 61 have surface-to-surface contact with each other. Hence, sliding resistance is dispersed to stabilize the operation of the lever and the eccentric cam, and partial wear of the lever 20 and the eccentric cam 61 can be prevented.

The end of the other lever (according to the present embodiment, the left lever 20 in FIG. 4) is not bent, and the plane lever end is made to abut against the side surface (the upper surface in FIG. 4) of the bent portion of the right lever 20. According to the present embodiment, not all of the two levers are made to abut against the eccentric cam 61 and moved, but one of the levers is moved via the other lever, and in this case, the end of the other lever is bent. Accordingly, interference between the two levers 20 moved by the eccentric cam 61 is prevented, thereby enabling a stable operation.

According to the present embodiment, the state of the eccentric cam 61, which is a member constituting the shutter drive mechanism, is detected by the sensor 66 via the detection lever 64, to detect the position of the shutter member 14 (the opening or closing state of the shutter) precisely. Based on the detection result, drive control or stop control of the motor 59, which is a driving source of the shutter, is performed, thereby determining the closing state or opening state of the shutter reliably.

Generally, a space in a real machine of the image forming apparatus for arranging a write unit as the optical scanning device is small, and hence it is difficult to have a long moving stroke of the shutter member. Therefore, it is necessary to maintain the positions of the shutter member in an optical path interrupting state and a non-interrupting state highly accurately. According to the present embodiment, the torsion coil spring 21 is used as the biasing unit for biasing the shutter member 14 toward the closing position, and the torsion coil spring 21 is provided on the upper cover 11 of the optical housing. Accordingly, since the shutter member 14, the levers 20 as the link member, and the torsion coil springs 21 as the biasing member are arranged on the same member, that is, the upper cover 11, the relative positions can be maintained highly accurately, and the positions of the shutter member in the optical path interrupting state and non-interrupting state can be maintained highly accurately.

Furthermore, according to the present embodiment, the torsion coil spring 21 mounted on the shaft 19, which is a rotation fulcrum of the lever 20 as the link member, is used as the biasing unit that biases the shutter member 14 toward the closing position. In this case, the flexibility of design with respect to the arranged position and the shape as the shutter member biasing unit decreases slightly, however, only the shaft 19 can be assigned as a point of pressure for shifting the shutter member, and an unexpected moment is not applied to the shutter member 14, and hence the shutter member 14 can be shifted smoothly and stably. If a tension spring or a compression spring is directly latched to the shutter member, the shutter member and/the link member may not be well balanced according to the arrangement of the spring, thereby causing a moment that adversely affects the linear movement of the shutter member. According to the present embodiment, however, since excessive moment does not occur, a stable movement of the shutter member can be achieved.

As shown in FIG. 10, a plurality (many) of reinforcing ribs extending in the longitudinal direction of the housing is provided in a protruding condition on the upper cover 11 of the optical housing. According to the present embodiment, shutter guides 24 are provided on an appropriate number of ribs (according to the present embodiment, 12) of the reinforcing ribs. The shutter guide 24 is provided by extending a part of the reinforcing rib upward so as to have a height higher than that of other parts of the rib. As described above, the shutter member 14 is mounted on the upper cover by the stepped screws 17 (FIG. 3) so as not to rise, while ensuring an appropriate gap required for sliding, and is supported slidably on the predetermined number of shutter guides 24 (according to the present embodiment, 12) provided on the upper surface of the upper cover 11. Thus, by supporting the shutter member 14 by the shutter guides 24 extending in the moving direction of the shutter member 14 and having a thin rib shape, the sliding resistance of the shutter member 14 can be reduced, thereby enabling a stable movement of the shutter member 14.

Figure 11:
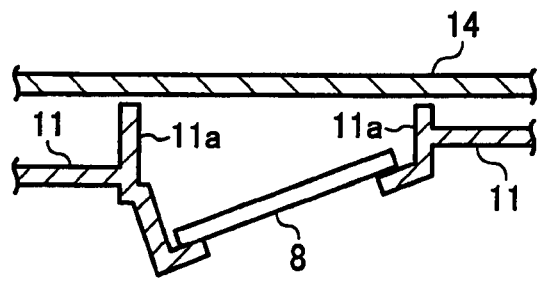
FIG. 11 is a cross section of a configuration near a dustproof glass-mounting unit.

As shown in FIG. 11, a portion surrounding a mounting portion of the dustproof glasses 8a, 8b, 8c, and 8d on the upper cover 11 is raised upward to form an upright portion 11a. Accordingly, when the shutter member 14 is in the closing state, the shutter member 14 and the upright portion 11a are adjacent to each other, with a gap hardly formed therebetween, thereby preventing the intrusion of the toner and dust.

According to the present embodiment, a link mechanism is adopted as a moving part that shifts the shutter member 14. In the link mechanism, the shutter member 14 is a member to be driven moved by the link mechanism, the levers 20 are link members, and the eccentric cam 61 is a driving unit that operates the levers, 20, together with the motor 59 as a drive source. In the link mechanism having such a configuration, the levers 20 are pivotally supported by the shafts 19 as a center of rotation. The position of the shafts 19 (the position of the rotation fulcrum of the levers 20) is arranged toward the eccentric cam 61 side, which is an actuating member, than the center of the lever 20. Accordingly, the shift amount of the eccentric cam 61 as the driving unit can be expanded and transmitted to the shutter member 14.

In other words, the shift amount of the shutter member 14 when the pair of levers 20 rotates, respectively about the shafts 19 is increased. For example, when a ratio of length between the outer portion (a distance from the shaft 19 to the pin-receiving hole 20a) and the inner portion (a distance from the shaft 19 to a portion abutting against the eccentric cam 61) of the lever 20 is assumed to be 2:1, the shutter member 14 can be moved by a distance twice the moving distance of the eccentric cam 61 in the direction A (see FIGS. 3 and 4). As described above, since the space in the real machine of the image forming apparatus for installing the optical scanning device is small, the shift amount (eccentricity) of the eccentric cam 61, which is a member constituting the driving unit, may not be ensured sufficiently. Furthermore, even when a driving mechanism having a different configuration is used, the stroke of the driving unit or actuating unit may not be ensured sufficiently. However, by using the link member and providing the fulcrum thereof toward the driving unit side than the center of the link member, a required shift amount of the shutter member can be obtained in a narrow space.

As in another embodiment described later, the shutter member 14 can be moved directly by the driving unit or actuating unit without using the link member. However, as according to the present embodiment, by moving the shutter member 14 via the link mechanism, the flexibility of design with respect to the moving direction and the moving stroke of the shutter can be increased.

According to the present embodiment, the end of one lever, of the pair of levers 20, is bent, and the end of the other lever is made to abut against the bent portion (see FIG. 10). Therefore, when one lever 20 (having the bent portion) is pushed by the eccentric cam 61 as the actuating member, the other lever 20 is pushed synchronized with the one lever 20, and as a result, the pair of levers 20 is driven simultaneously by the same amount. Consequently, the driving timing, driving force, and driving stroke with respect to the pair of levers 20 as the link member can be equalized, thereby enabling a smooth, stable, and repetitive movement of the shutter member 14, without applying an unexpected moment to the shutter member 14.

According to the present embodiment, of the mechanism for moving the shutter member, the driving unit (the motor 59 as the drive source and the eccentric cam 61) is arranged on the image forming apparatus main unit. Accordingly, the unit cost and the weight of the optical scanning device 15 can be reduced. Therefore, when the optical scanning device is to be replaced after shipping the image forming apparatus, it is advantageous in view of the cost and workability. At the time of attaching or detaching the optical scanning device 15, it is not necessary to attach or detach the harness in the driving unit, and the driving unit, which is a source of vibration, is not mounted directly in the optical scanning device 15, thereby avoiding adverse effect on the image.

On the other hand, the driving unit can be mounted on the optical scanning device. Although not shown, when the driving unit is mounted on the optical scanning device, high accuracy of respective parts in the mechanism for moving the shutter member can be maintained, thereby enabling a highly accurate opening and closing operation of the shutter member. It is appropriately selected whether to mount the driving unit on the optical scanning device or on the image forming apparatus main unit, according to the system layout or the like.

According to the present embodiment, the sensor 66 that detects the opening or closing state of the shutter member 14 is provided so as to detect the movement of the eccentric cam 61 (via the detection lever 64) as the driving unit, which is one of the members constituting the mechanism for moving the shutter member. However, the present invention is not limited to this configuration, and a configuration in which the motor 59 or the eccentric cam 61 is directly detected, or a movement of the levers 20, which is another member, is detected by the sensor is also possible.

Figure 12A:
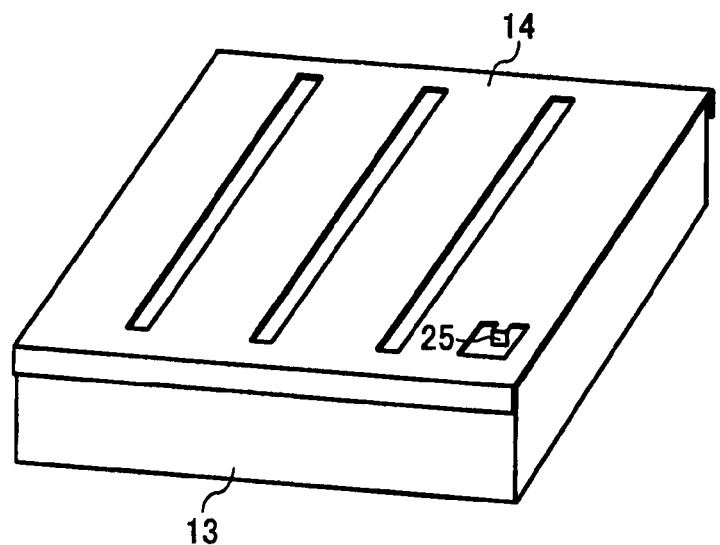
FIGS. 12A and 12B are schematic perspective views of another configuration example for detecting an opening/closing state of a shutter.
Figure 12B:
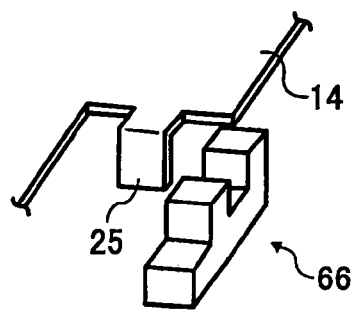

Furthermore, a configuration in which a part of the shutter member 14 is directly detected is also possible. For example, as shown in FIGS. 12A and 12B, a portion to be detected 25 is provided in a part of the shutter member 14, so that the portion to be detected 25 is detected by the sensor 66. In this configuration example, the sensor 66 is arranged on the upper cover 11 of the optical housing. With a reciprocating movement of the shutter member 14 in the direction A in FIGS. 2 and 3, the portion to be detected 25 interrupts the photo interrupter in the sensor 66 at the shutter closing position. When the shutter is opened, since the portion to be detected 25 is pulled out from the sensor 66, the opening or closing state of the shutter can be detected based on the output of the sensor 66.

When the sensor that detects the opening or closing state of the shutter is mounted on the optical scanning device side, since the movement of the shutter member can be directly detected, highly accurate detection becomes possible. On the other hand, the cost of the optical scanning device itself, which can be considered to be a service unit, increases, and manageability of the harness (required for transmitting the sensor output to the apparatus main unit) at the time of attaching or detaching the optical scanning device deteriorates. Accordingly, an optimum method as the system can be appropriately selected whether to arrange the sensor for detecting the opening or closing state of the shutter on the image forming apparatus main unit side or to arrange it on the optical scanning device side.

Figure 13:
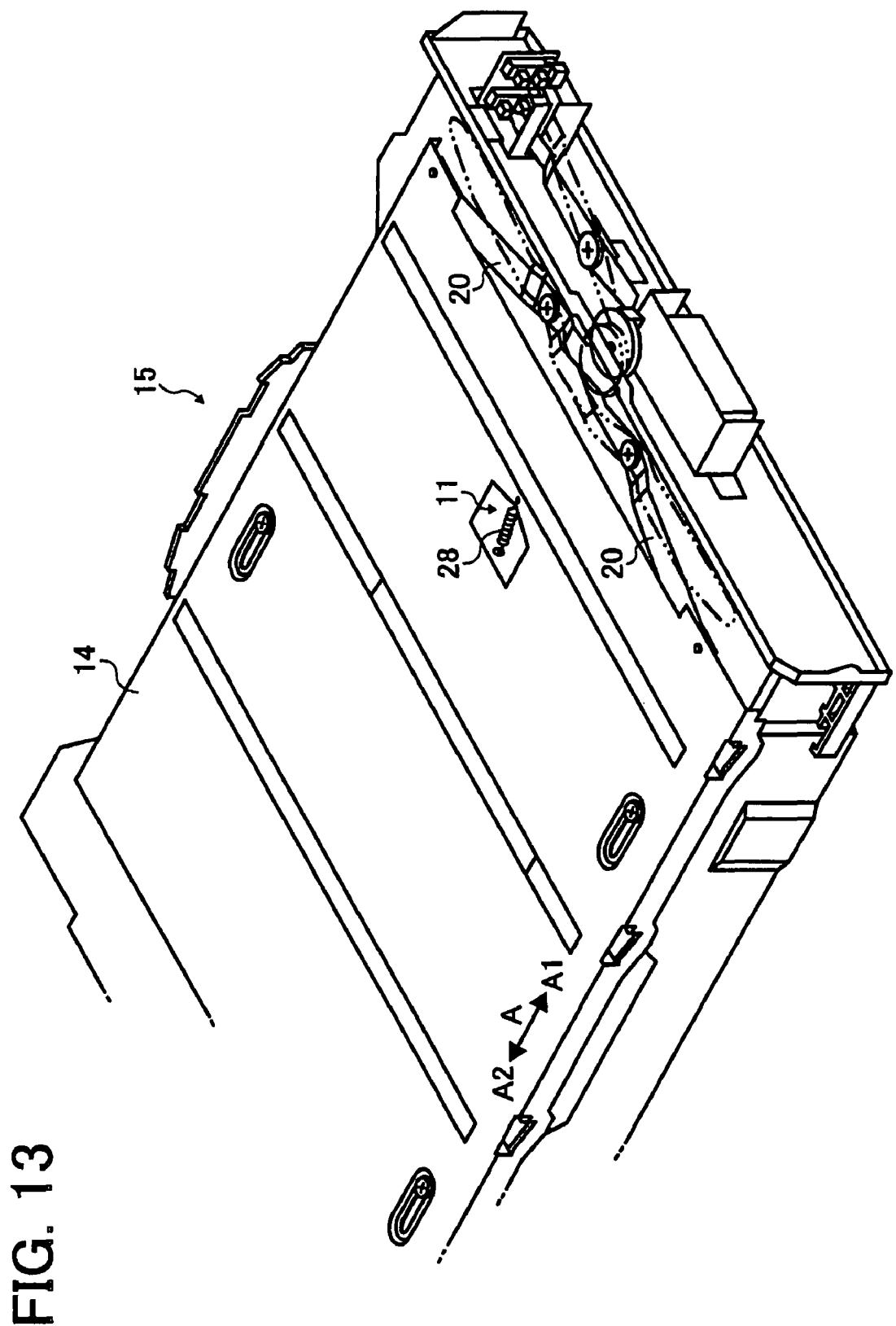
FIG. 13 is a perspective view of another example of a shutter biasing unit using a tension spring.

FIG. 13 depicts another example in which a tension spring is used as the biasing unit that biases the shutter member 14. In the illustrated example, the tension spring 28 is latched between the shutter member 14 and the upper cover 11 of the optical housing. When the shutter member 14 is moved from the shutter closing position in a direction of A1 shown in FIG.

13, the tension spring 28 is pulled by the shutter member 14. Therefore, the shutter member 14 is biased in a direction of closing the shutter by the tension spring 28. In this configuration, the tension spring 28 is latched at a position determined by taking into consideration a balance with the levers 20 as the link members, so as not to generate a moment that adversely affects the linear movement of the shutter member 14.

Figure 14:
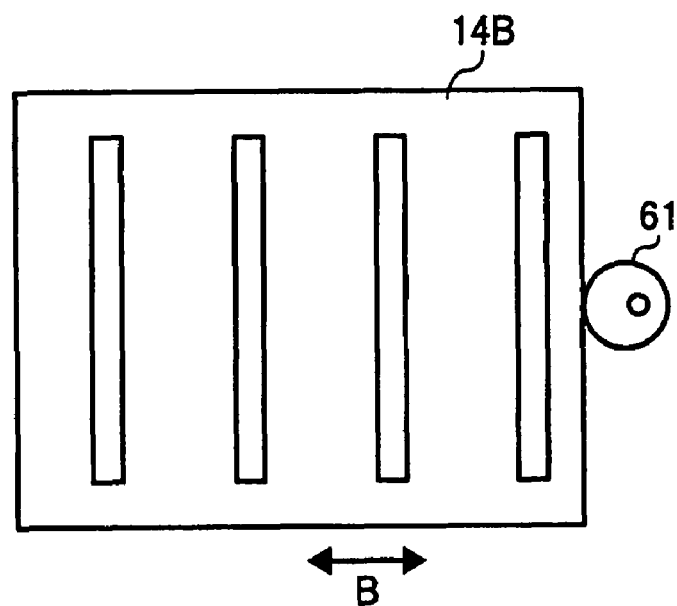
FIG. 14 is an explanatory diagram of another example (eccentric cam) of a shutter moving mechanism.

FIG. 14 depicts a configuration example in which a shutter member 14B is directly driven by the eccentric cam 61. According to the present embodiment, the shutter member 14B that is brought into direct contact with the eccentric cam 61 is linearly moved in a direction of B indicated by arrow, corresponding to the movement of the eccentric cam 61 rotated by the motor.

Figure 15:
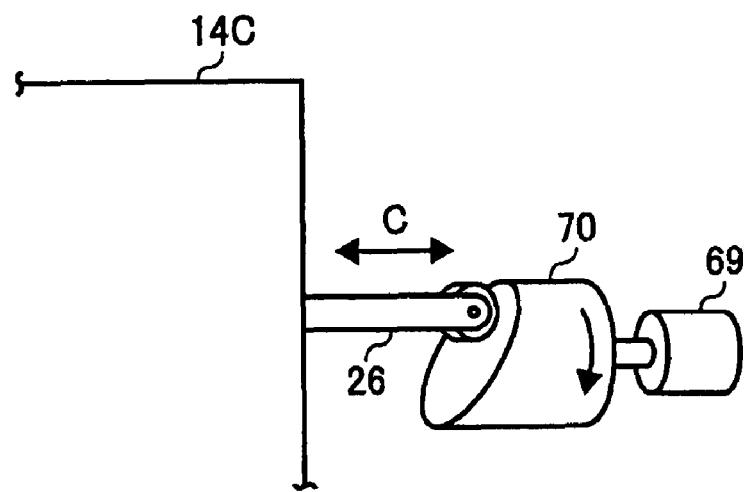
FIG. 15 is an explanatory diagram of another example (three-dimensional cam) of the shutter moving mechanism.

There is another method for converting the rotation of the motor as the drive source to a linear movement of the shutter member. In an example shown in FIG. 15, a shutter member 14C is fitted with a rod with roller 26 having a roller at on end, and is biased by an biasing unit (not shown) rightward in FIG. 15. The roller of the rod with roller 26 is made to abut against a slope of a conversion member 70. When the conversion member 70 having the slope obtained by diagonally cutting a cylinder is rotated by a motor 69, the shutter member 14C is linearly moved in a direction C indicated by arrow.

Figure 16:
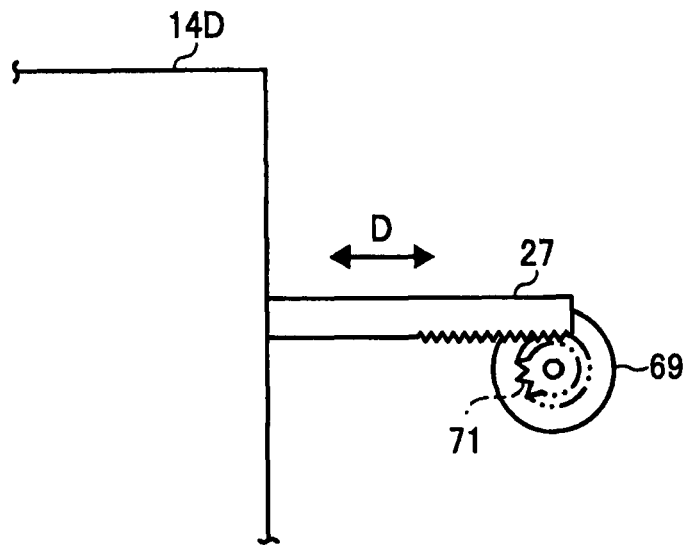
FIG. 16 is an explanatory diagram of another example (rack pinion gear) of the shutter moving mechanism.

In an example shown in FIG. 16, a rack member 27 having a rack at one end is fitted to a shutter member 14D. The rack of the rack member 27 is meshed with a gear 71 rotated by the motor 69. By reciprocally rotating the motor 69, the shutter member 14D is linearly moved in a direction D indicated by arrow.

Figure 17:
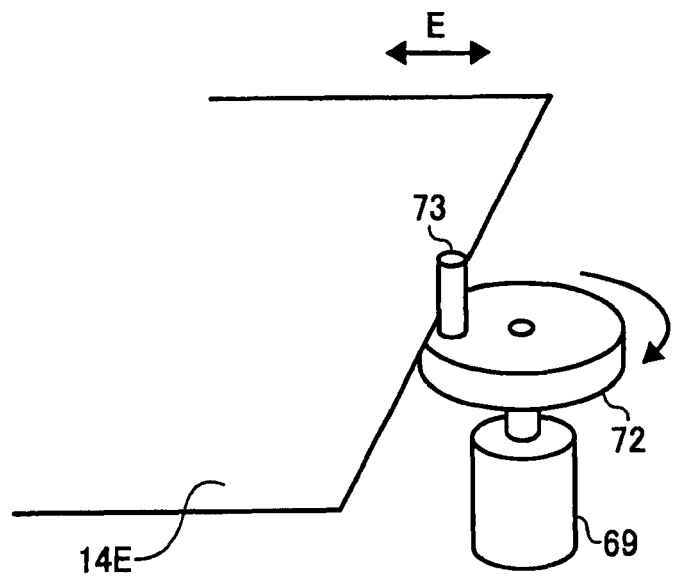
FIG. 17 is an explanatory diagram of another example (disk and pin) of the shutter moving mechanism.

In an example shown in FIG. 17, a pin 73 is provided in a protruding condition on a disk 72 rotated by the motor 69 at a position deviated from the center thereof. A shutter member 14E is biased rightward in FIG. 17 by an biasing unit (not shown), so as to abut against the pin 73. When the disk 72 is rotated by the motor 69, the shutter member 14E is linearly moved in a direction E indicated by arrow.

In such configurations not using the link member, there is a restriction relating to the shutter stroke, as compared to the configuration in which the shutter member is moved via the link member, however, the number of parts can be reduced and a simple and low-cost configuration can be obtained. An appropriate configuration can be selected according to the specification required for the system of the image forming apparatus, an apparatus layout, or the like.

When the driving unit that drives the shutter member is arranged on the image forming apparatus main unit, it is preferable to arrange the driving unit between the optical scanning device and a paper feed path.

As a direction of attaching or detaching the optical scanning device, the optical scanning device is generally attached or detached on the opposite side to the paper feed path or on the front side of the apparatus. Accordingly, as an installation position of the driving unit that drives the shutter member, a position between the optical scanning device and the paper feed path, which is the rear side of the attaching or detaching direction of the optical scanning device, or on the inner side of the apparatus can be considered, so as not to hinder the attaching or detaching operation. However, on the inner side of the image forming apparatus, a driving system of the apparatus is arranged and the space is limited, and if the driving unit is arranged at a position right-angled with respect to the shutter moving direction, the configuration becomes complicated, thereby decreasing the flexibility of design. Therefore, it is most suitable to arrange the driving unit between the optical scanning device and the paper feed path. According to the present embodiment, as is clearly shown in FIGS. 1 to 3, the motor 59 and the eccentric cam 61 are arranged between the optical scanning device 15 and the paper feed path from the paper feeder 52 (on the right side of the optical scanning device 15 in FIG. 1).

While the present invention has been explained with reference to the illustrated examples, the present invention is not limited thereto. For example, not only the eccentric cam but also a normal cam formed of a non-disk member can be used as the conversion mechanism that converts the rotation of the motor to the linear movement to shift the shutter member. When the link mechanism is used, the shape and the position of fulcrum of the link member can be appropriately set. The configuration of the respective units in the optical scanning device can be appropriately selected within the scope of the present invention. In the image forming apparatus including the optical scanning device mounted thereon, the type of the imaging unit and the configuration of respective units in the apparatus are optional. The image forming apparatus can be not only the printer, but also a copying machine, a fax machine, and a multifunction product.

Figure 18:
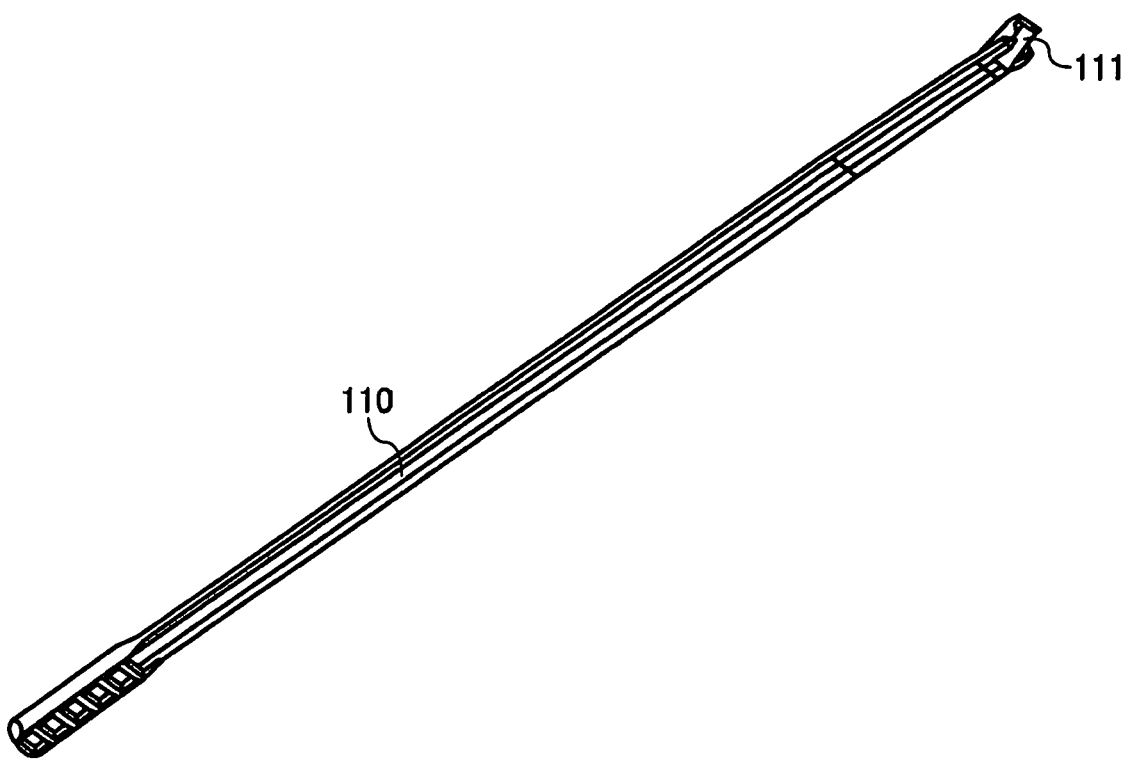
FIG. 18 is an explanatory diagram of a configuration example of a cleaning unit of an emission window.
Figure 19:
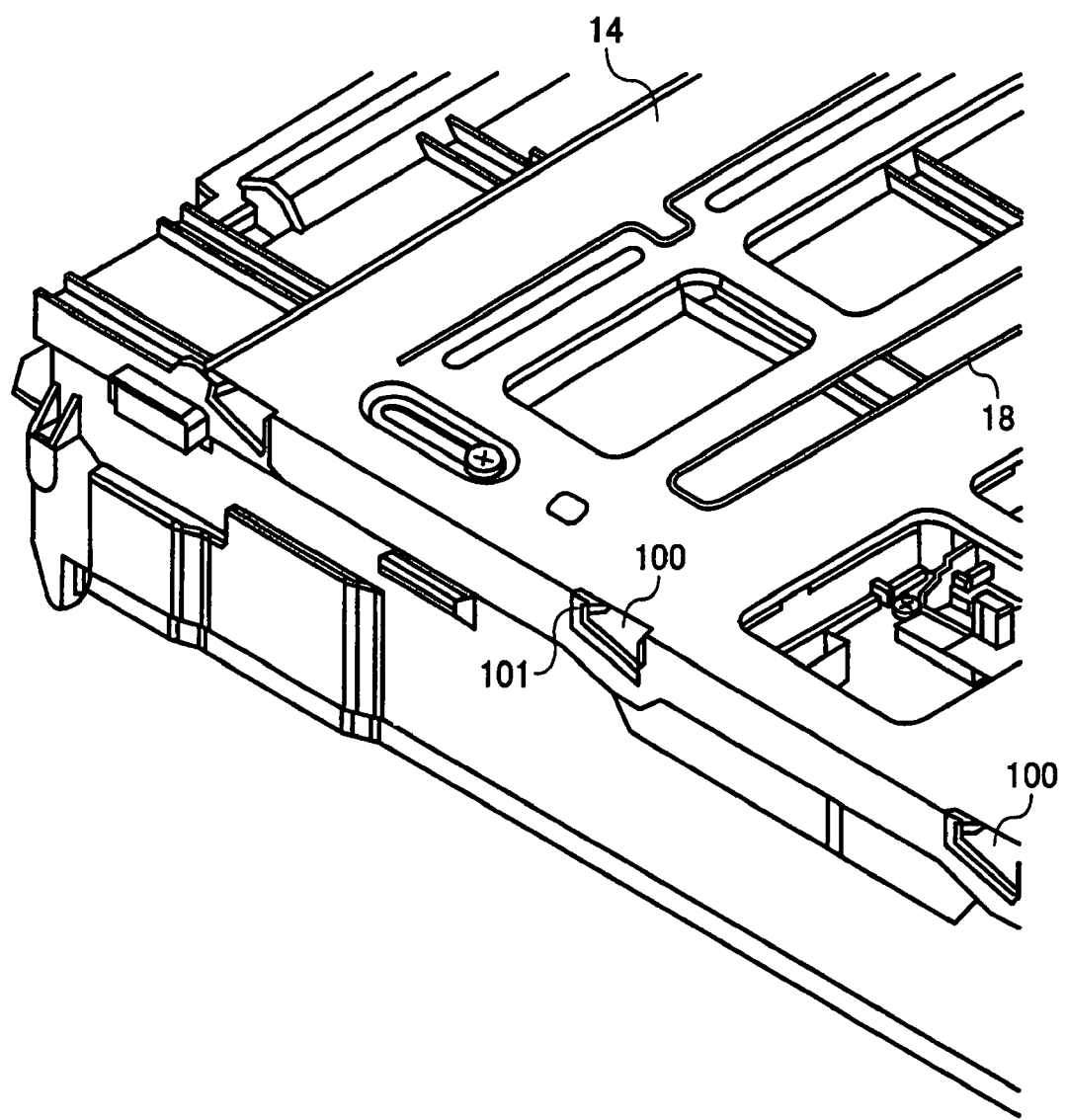
FIG. 19 is an explanatory diagram of a guide shape for inserting the cleaning unit and a configuration of an insertion opening.

A cleaning mechanism of the shutter is explained next. FIG. 18 is a perspective view of a shape example of the cleaning unit. FIG. 19 depicts the position of an insertion opening for the cleaning unit provided in the shutter member and a guide shape of the cleaning unit.

As explained above, the optical system is housed in a sealed container (the optical housing 13) to prevent adhesion of dust, dirt, and toner. Emission windows for emitting the laser beams onto the photo-sensitive drums 9a, 9b, 9c, and 9d are formed in the sealed container. A transparent member (the dustproof glasses 8a, 8b, 8c, and 8d) is normally provided in the emission window (opening 18), to maintain the sealability in the sealed container.

Furthermore, the shutter member 14 that reciprocates on the first openings 18 through which the scanning beams pass in a direction approximately orthogonal to an optical scanning direction to open or close the openings 18 is arranged outside of the light emission window (the dustproof glasses 8a, 8b, 8c, and 8d) of the optical housing 13 (see FIG. 2). Accordingly, any recording is not performed, particularly when a toner cartridge or the image carrier is to be replaced, the shutter member 14 is shifted to the closing position, to adhesion of dust and toner to the dustproof glasses 8a, 8b, 8c, and 8d of the light emission window.

As shown in FIG. 3, insertion openings (second openings 100) for the cleaning unit 110 are provided at positions where the mission windows are extended in the light scanning direction, on a side approximately orthogonal to the surface on which the light emission windows (openings 18) are provided.

When a user cleans the dustproof glasses 8a, 8b, 8c, and 8d, the cleaning unit 110 as shown in FIG. 18 is inserted into the insertion opening for the cleaning unit 110 as shown in FIG. 3, to make a cleaning member 111 abut against the dustproof glasses 8a, 8b, 8c, and 8d, thereby performing a cleaning operation.

As a result, a configuration in which the shutter member 14 does not need to be unnecessarily large and a space required for the cleaning operation does not need to be provided on the surface to be scanned can be provided.

As described above, since the recent image forming apparatuses have high image quality, a problem such that the toner in the image forming apparatus tends to adhere to a transparent member such as the dustproof glass provided in the light emission window of the optical write unit to interrupt the laser beams, thereby causing degradation of image quality is likely to occur, as compared to conventional configurations.

Accordingly, the guide shape 101 for cleaning the dustproof glasses 8a, 8b, 8c, and 8d and the shape of the insertion opening 100 are substantially made to agree with each other only when the shutter member 14 is at a position for protecting the light emission window (the shutter closing position).

Furthermore, the insertion openings 100 for the cleaning unit 110 are arranged at positions away from the guide shapes 101, at a position where the laser beams are emitted to the photo-sensitive drums 9a, 9b, 9c, and 9d (in the shutter opening state) (see FIG. 19).

As a result, since the cleaning unit 110 can be inserted only when the cleaning operation is possible, erroneous operations can be prevented. Further, at the time of opening the shutter, since the insertion opening 100 for the cleaning unit is at a position away from the guide position, intrusion of dirt from the insertion opening 100 can be prevented, thereby minimizing adhesion of dirt to the dustproof glasses 8a, 8b, 8c, and 8d in the shutter opening state.

Figure 20:
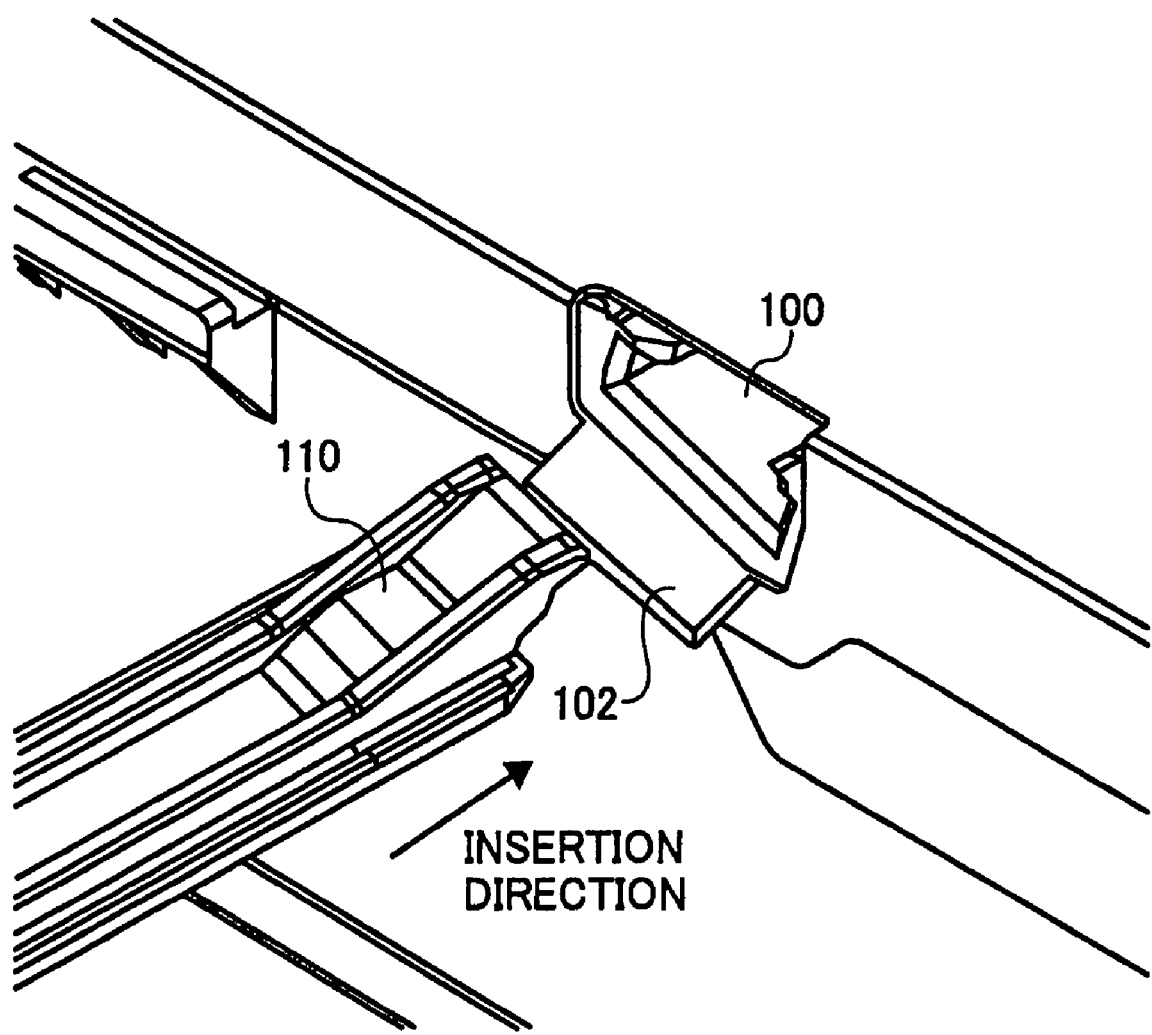
FIG. 20 is an explanatory diagram of a relationship between the cleaning unit and inclination of the insertion opening.

Furthermore, by providing a slope 102 in the insertion opening 100 for the cleaning unit 110 on the shutter member 14 with respect to the insertion direction, the slope 102 serves as a guide to facilitate the insertion of the cleaning unit 110 (see FIG. 20). Accordingly, user's operability can be further improved.

Figure 21:
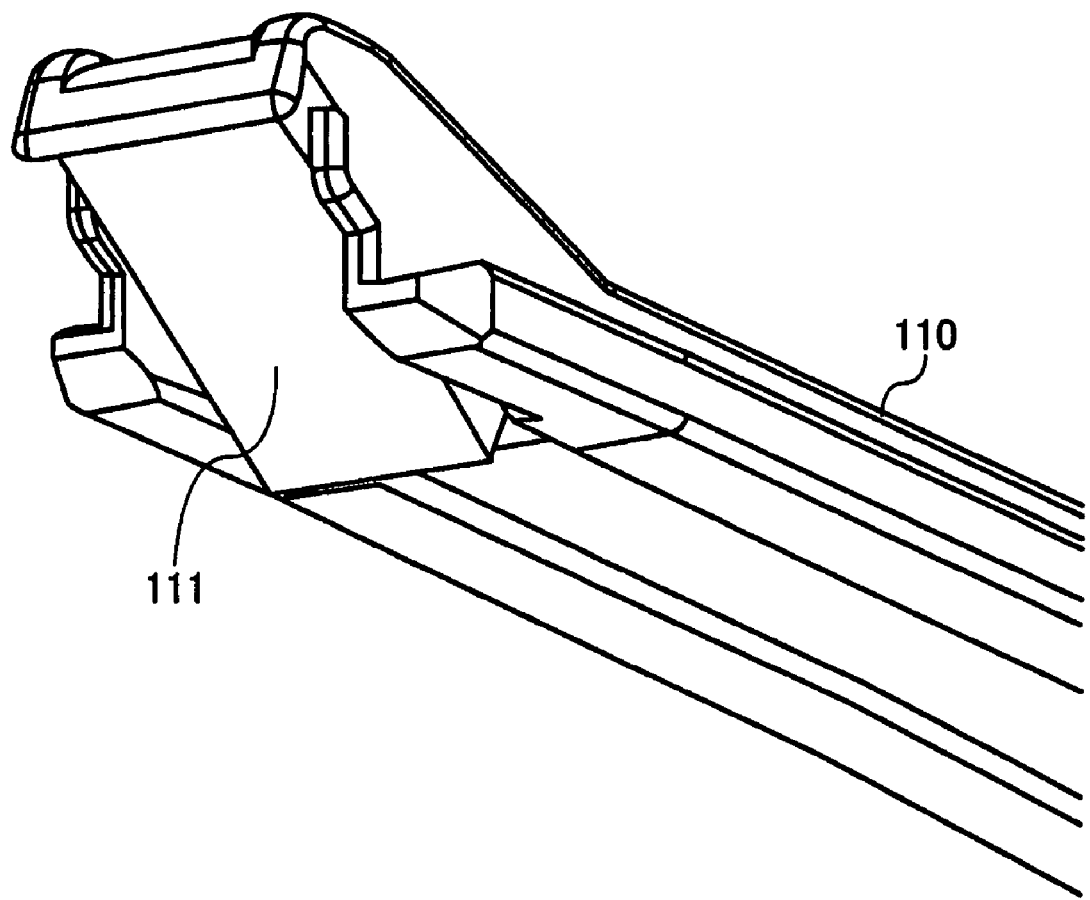
FIG. 21 is an explanatory diagram of a shape example of a cleaning member in the cleaning unit.
Figure 22:
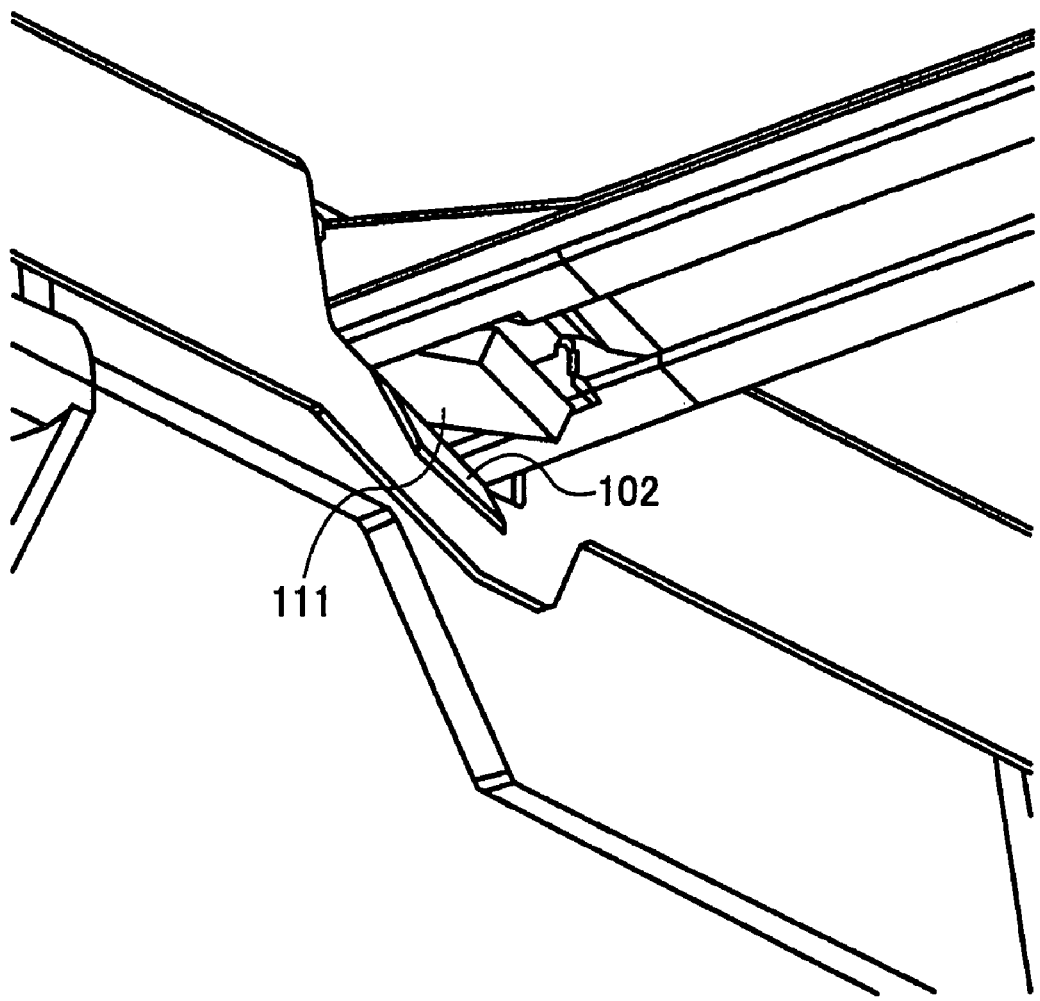
FIG. 22 is an explanatory diagram of a relationship between the cleaning member in the cleaning unit and a slope.

As shown in FIG. 22, by bringing the end of the cleaning unit 110 (see FIG. 21), that is, the cleaning member 111 into contact with the slope 102 of the shutter member 14, adhered dirt to the cleaning member 111 can be removed before starting the cleaning operation.

As a result, cleaning effect can be increased, and it can be prevented that dirt adheres to the parts other than the cleaning member of the cleaning unit 110 and re-adhering to the dustproof glasses 8a, 8b, 8c, and 8d. At the same time, it can be prevented that the dirt adhered to the cleaning member 111 adheres to a cleaning worker.

Figure 23:
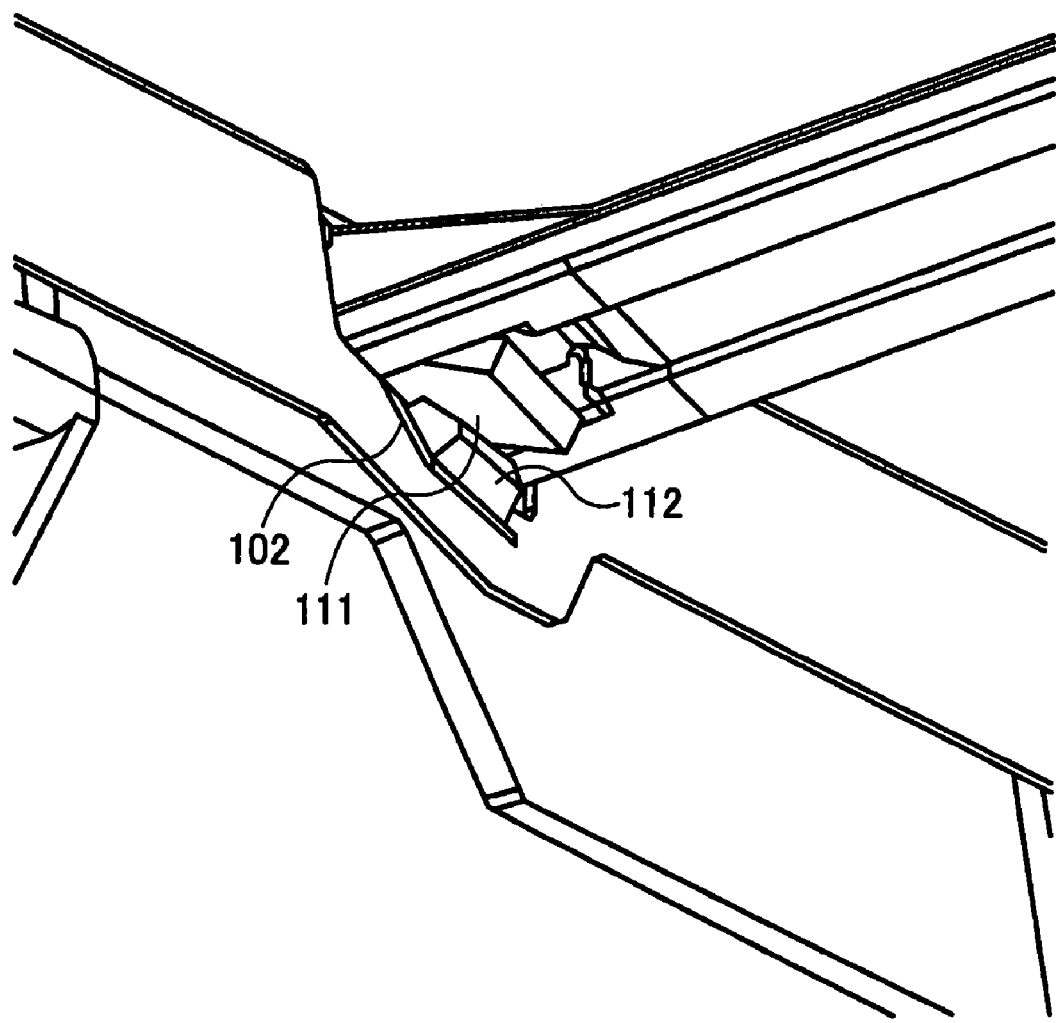
FIG. 23 is an explanatory diagram of an example in which a brush or an elastic body is arranged in the slope provided in the shutter.

Furthermore, the dirt removing effect of the cleaning member 111 can be increased by arranging an elastic member 112 such as a brush or sponge at a position coming in contact with the cleaning member 111 (see FIG. 23).

Further, when the optical scanning device is arranged below the horizontal direction with respect to the image carrier, dirt in the image forming apparatus is likely to adhere to the transparent member such as the dustproof glasses 8a, 8b, 8c, and 8d provided in the light emission window. However, according to the present embodiment, excellent cleanability can be ensured by emitting the laser beams from the apparatus upward than the horizontal direction.

On the other hand, since the shutter member 14 configured so as to be able to insert the cleaning member and the cleaning member are provided in the image forming apparatus using the electrophotographic method such as a copying machine, a printer, and a fax machine, the possibility of adhesion of dust and toner to the dustproof glasses 8a, 8b, 8c, and 8d of the light emission window can be reduced, and adhered dust and toner can be removed. Accordingly, downtime of the image forming apparatus can be reduced.

In such an image forming apparatus, a substantially spherical toner is frequently used recently due to a demand of high quality. However, since the substantially spherical toner has poor cleanability as compared to the conventional ones, sufficient cleaning effect may not be obtained when the light emission window is cleaned.

Figure 24A:
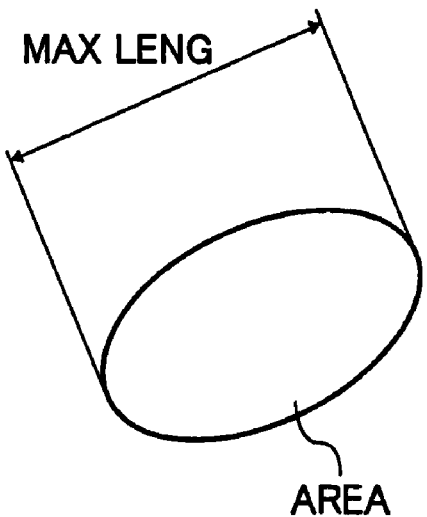
FIGS. 24A and 24B are schematic diagrams of a toner for explaining shape factors SF1 and SF2.

This toner can be identified by shape factors SF1 and SF2. The shape factor SF1 referred to herein is an index, as shown in FIG. 24A, indicating a degree of roundness of a particle (degree of flat deformation from a true spherical shape), and is expressed by a value obtained by dividing a square of maximum length MAXLENG of an elliptical figure obtained by projecting a substance on a two-dimensional surface by an area of the figure AREA, which is then multiplied by $(\pi/4) \times 100$ (see equation (1)).

Figure 24B:
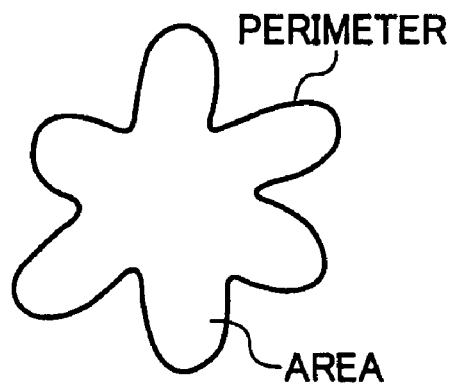

The shape factor SF2 is an index, as shown in FIG. 24B, indicating a degree of irregularity on the particle surface (the number of irregularities on the surface), and is expressed by a value obtained by dividing a square of perimeter of the figure PERIMETER obtained by projecting a substance on the two-dimensional surface by the area of the figure AREA, which is then multiplied by $(\pi/4) \times 100$ (see equation (2)).

$$SF1 = \{(MAXLENG)2/AREA\} \times (\pi/4) \times 100 \quad (1)$$

$$SF2 = \{(PERIMETER)2/AREA\} \times (\pi/4) \times 100 \quad (2)$$

When the value of SF1 is 100, the substance shape is a true spherical shape, and as the value of SF1 increases, the substance shape becomes an indeterminate form. When the value of SF2 is 100, the substance surface does not have irregularity, and as the value of SF2 increases, irregularity on the substance surface becomes noticeable.

According to the present embodiment, by using a toner having the shape factor SF1 in a range of from 100 to 150, and the shape factor SF2 in a range of from 100 to 140, repletion of the toner in the toner image can be increased, and the thickness of an image layer is reduced, to obtain a high-definition image, and stable cleanability can be maintained for a long time. Accordingly, high resolution picture quality capable of forming a stable image with excellent reproducibility can be obtained, and the cleaning operation can be performed reliably, thereby enabling maintenance of the apparatus performance for a long period.

In the image forming apparatus having the optical scanning device mounted thereon, the imaging method and the configuration of respective units in the apparatus are optional. In addition, the image forming apparatus is not limited to the printer, and can be a copying machine, a fax machine, or a multifunction product including these functions.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that outputs a light beam from a light source through an emission window in an optical housing to scan a surface to be scanned, the optical scanning device comprising:

a shutter member that closes or opens the emission window;

wherein the shutter member includes:

a first opening that is provided to allow the light beam having been passed through the emission window to pass the first opening; and a second opening that is provided at a position corresponding to an insertion operation of a cleaning member for cleaning the emission window; and wherein a surface inclined in an insertion direction of the cleaning member is provided near the second opening.

2. The optical scanning device according to claim 1, further comprising:

a guide mechanism for guiding a movement of the shutter member when the shutter member closes or opens the emission window.

3. The optical scanning device according to claim 2, wherein the guide mechanism has a separation preventing unit that prevents separation of the shutter member from the optical housing.

4. The optical scanning device according to claim 1, further comprising:
a holding unit that holds the shutter member at either one of a shutter closing position and a shutter opening position.

5. The optical scanning device according to claim 1, further comprising:
a detector that detects a closing state and an opening state of the shutter member.

6. The optical scanning device according to claim 1, wherein plural emission windows are provided, and
wherein the shutter member closes and opens the emission windows at once.

7. The optical scanning device according to claim 1, wherein the emission window is provided on an upper surface of the optical housing, and
wherein the shutter member is arranged above the optical housing.

8. The optical scanning device according to claim 1, wherein the shutter member is biased by a biasing unit in a direction of covering the emission window.

9. The optical scanning device according to claim 1, wherein the shutter member is driven by a driving unit arranged outside of the optical scanning device.

10. The optical scanning device according to claim 9, wherein the shutter member is directly driven by the driving unit.

11. The optical scanning device according to claim 9, wherein the shutter member is driven by the driving unit via a movable member.

12. The optical scanning device according to claim 11, wherein the movable member is arranged in the optical scanning device.

13. The optical scanning device according to claim 1, wherein a driving unit that drives the shutter member is arranged in the optical scanning device.

14. The optical scanning device according to claim 1, further comprising:
an upright portion raised to surround a perimeter of the emission window;
wherein when the shutter member is in a closing state, the shutter member and the upright portion are adjacent to each other to close the emission window.

15. The optical scanning device according to claim 1, wherein the second opening is provided at a position corresponding to an extension of the emission window in an optical scanning direction.

16. The optical scanning device according to claim 1, wherein the inclined surface is provided at a position coming in contact with the cleaning member at a time of inserting the cleaning member.

17. An image forming apparatus, comprising:
an optical scanning device that outputs a light beam from a light source through an emission window in an optical housing to scan a surface to be scanned;
wherein the optical scanning device includes:
a shutter member that closes or opens the emission window; and
wherein the shutter member includes:
a first opening that is provided to allow the light beam having been passed through the emission window to pass the first opening; and
a second opening that is provided at a position corresponding to an insertion operation of a cleaning member for cleaning the emission window.

18. The image forming apparatus according to claim 17, wherein the optical scanning device is arranged below an imaging unit.

19. An optical scanning device that outputs a light beam from a light source through an emission window in an optical housing to scan a surface to be scanned, the optical scanning device comprising:
a shutter member that closes or opens the emission window;
wherein the shutter member includes:
a first opening that is provided on a front surface of the shutter member to allow the light beam having been passed through the emission window to pass the first opening; and
a second opening that is provided on a side surface of the shutter member to allow a cleaning member to be inserted through the second opening for cleaning the emission window.

20. The optical scanning device according to claim 19, wherein the first opening includes a plurality of third openings,
wherein a longitudinal direction of the third openings is parallel with a main-scanning direction of the optical scanning device,
wherein the third openings are provided along a sub-scanning direction of the optical scanning device, and
wherein the second opening includes a plurality of fourth openings, provided on a side surface of the shutter member, at positions where the third openings are extended in the main-scanning direction.

\* \* \* \* \*